No. 876,485.
PATENTED JAN. 14, 1908.
W. T. McRAE & W. W. CANBY.
BOX MAKING MACHINE.
APPLICATION FILED JAN. 9, 1904. RENEWED APR. 4, 1907.
20 SHEETS—SHEET 2.
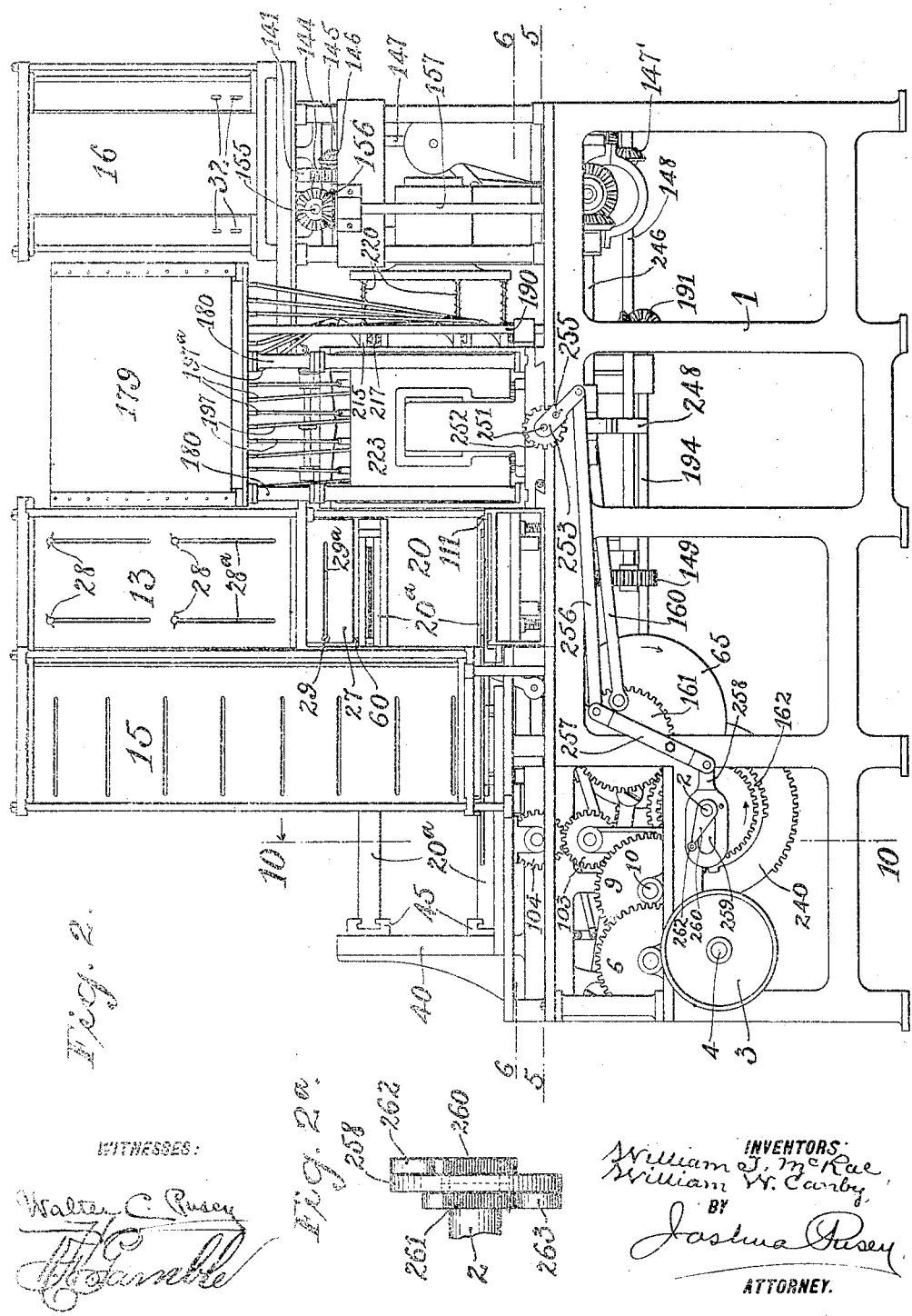
WITNESSES:
INVENTORS:
William T. McRae
William W. Canby
BY
Joshua Pusey
ATTORNEY.

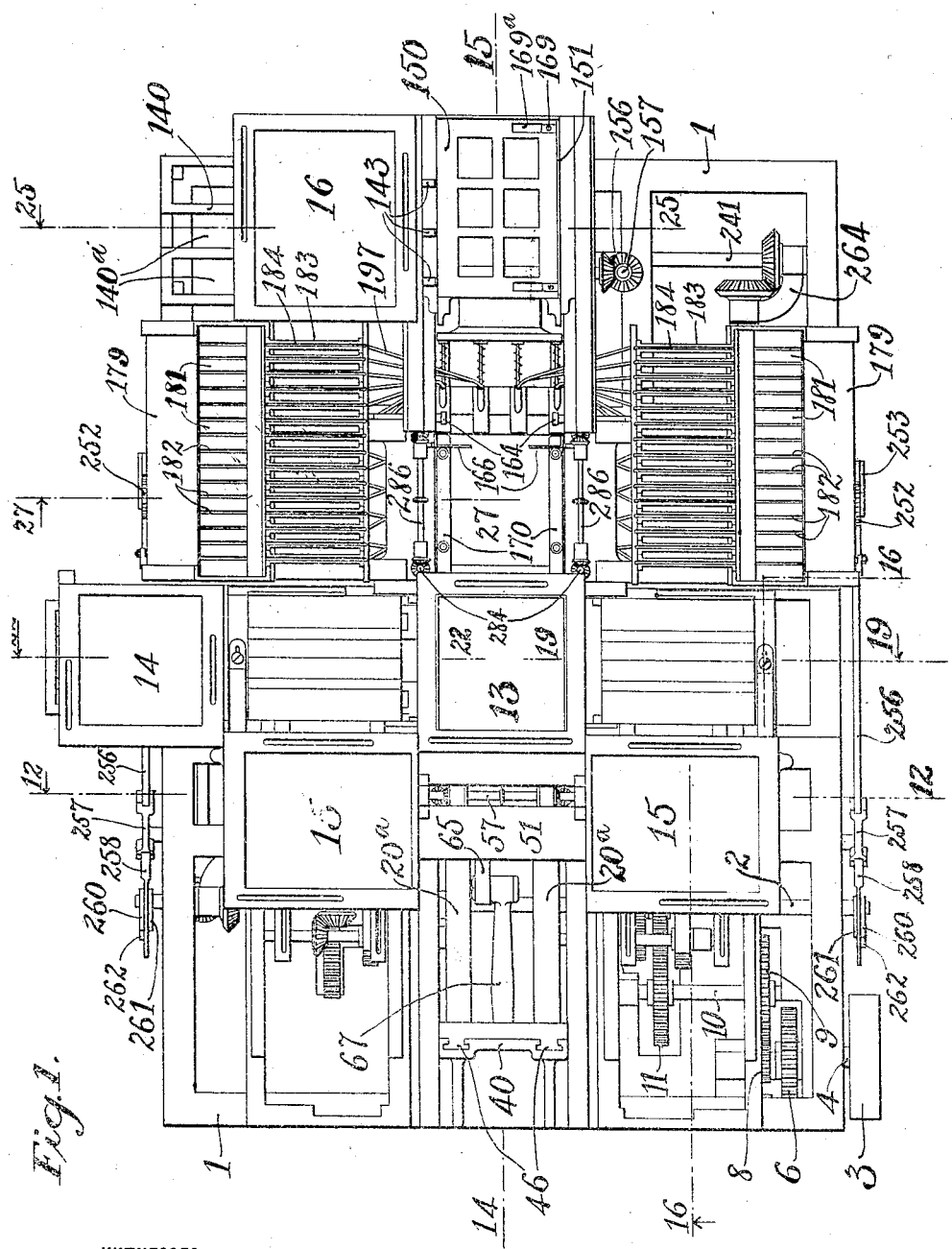

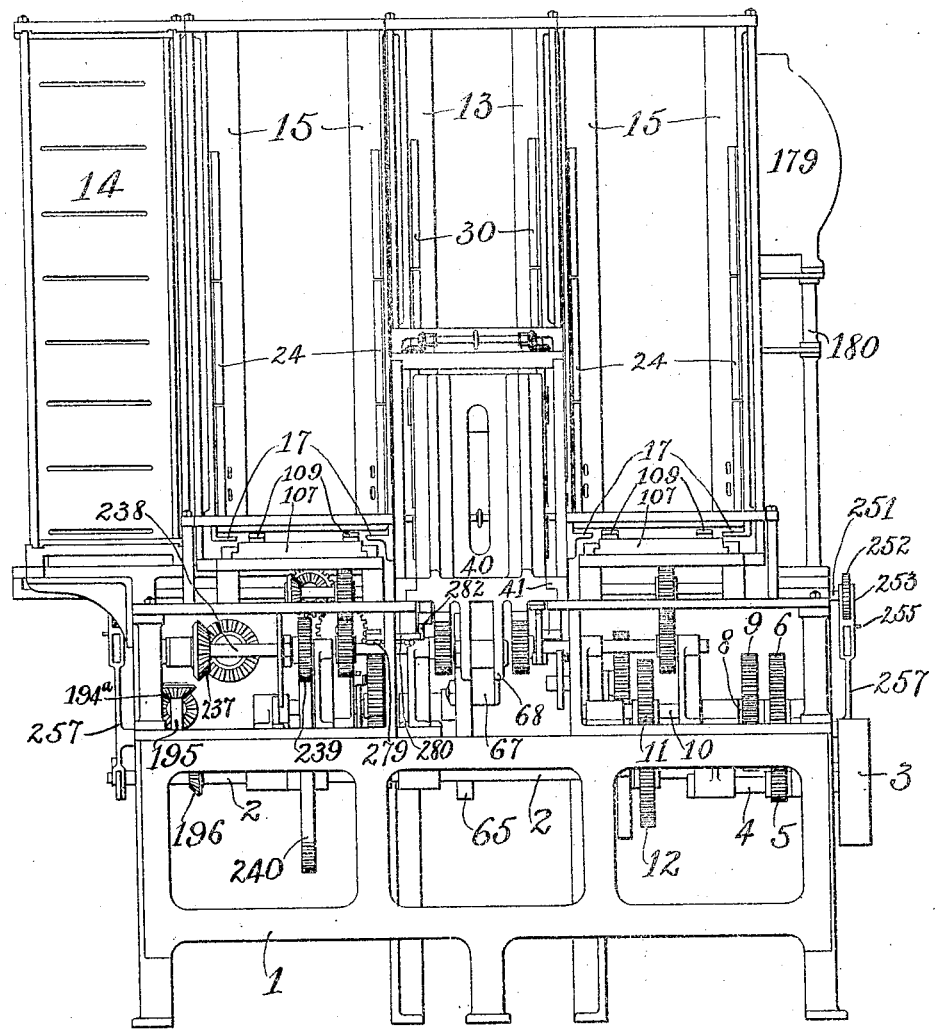

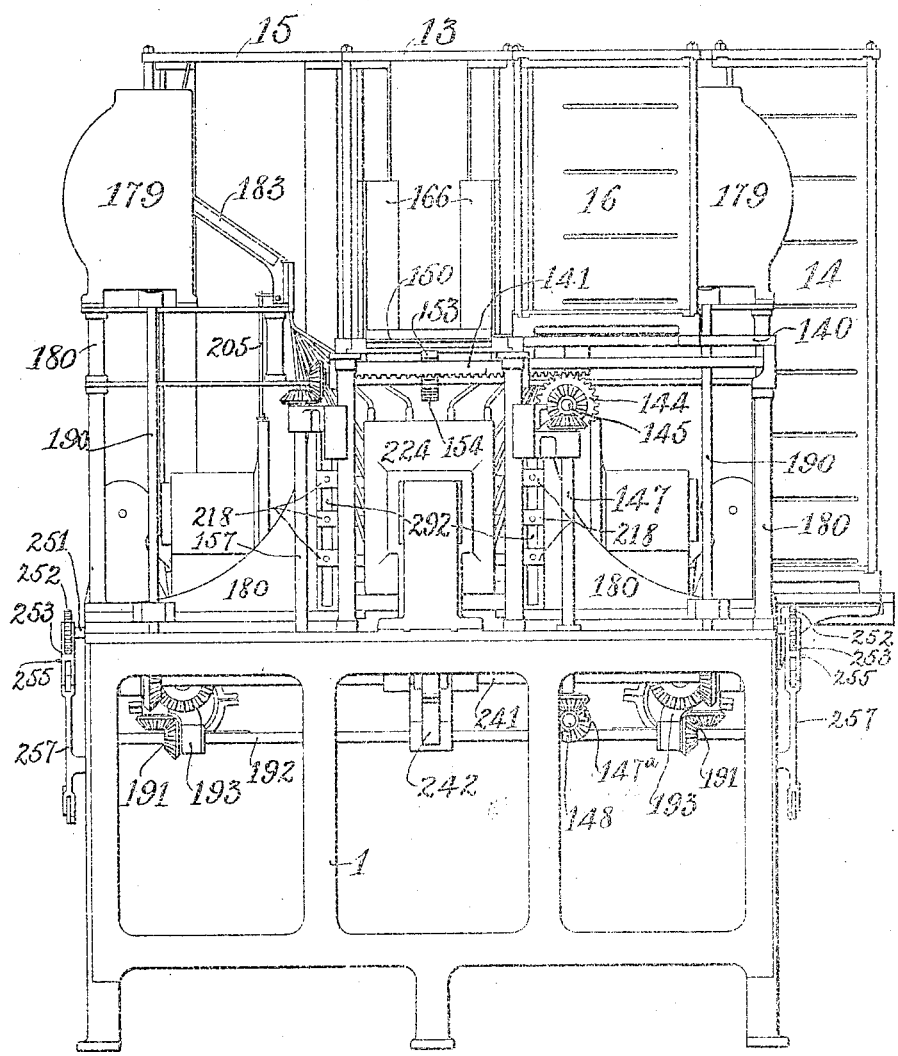

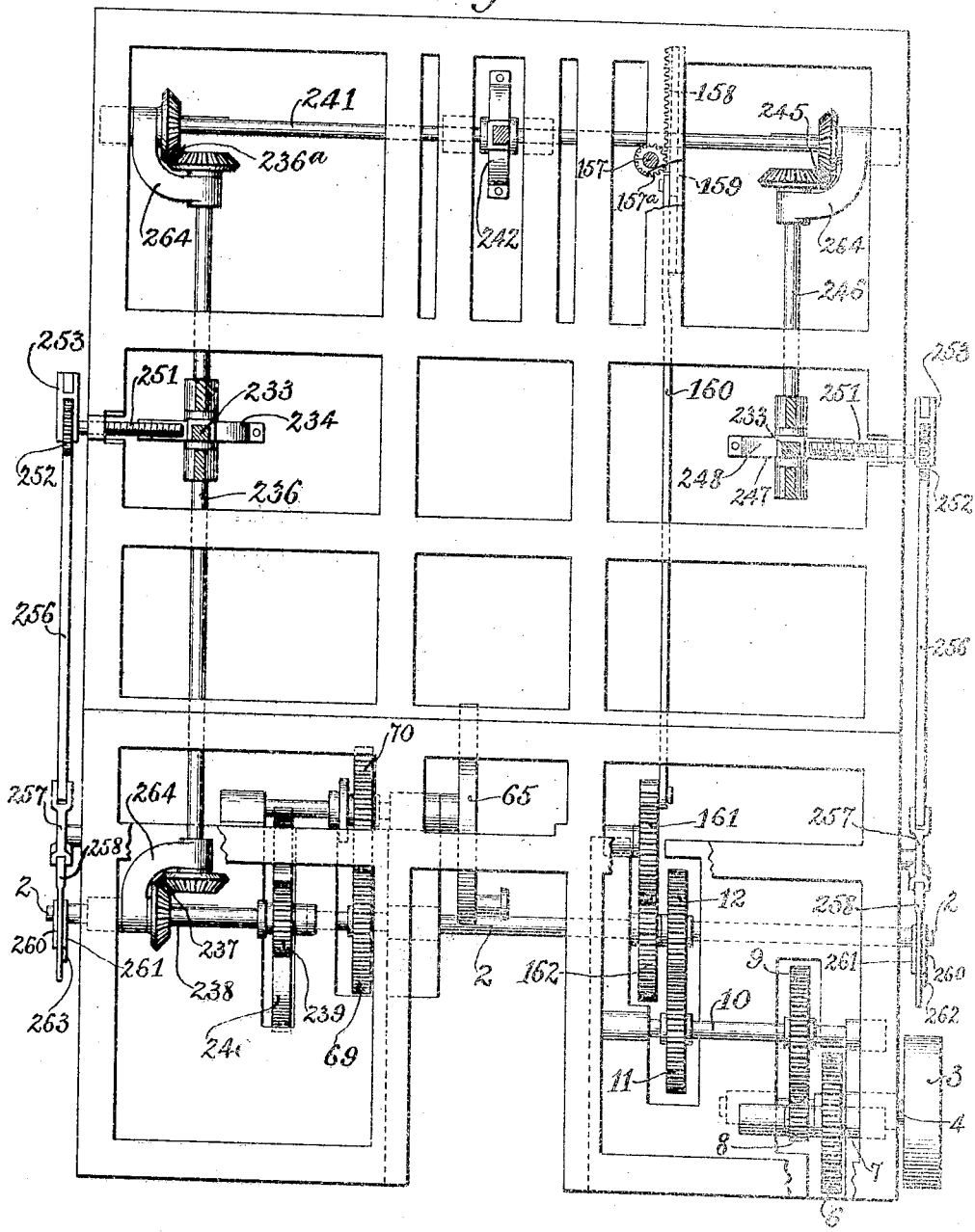

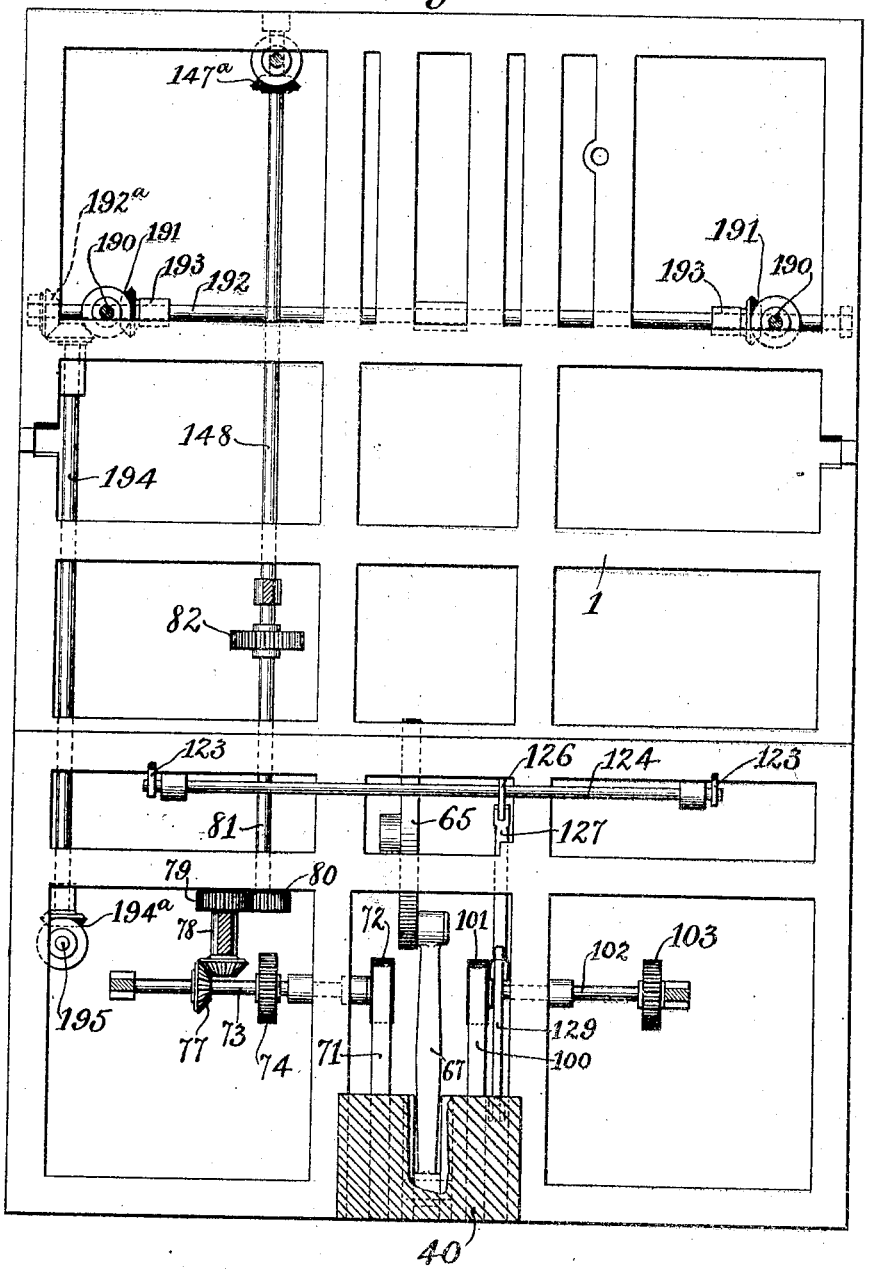

No. 876,485.   PATENTED JAN. 14, 1908.
W. T. McRAE & W. W. CANBY.
BOX MAKING MACHINE.
APPLICATION FILED JAN. 9, 1904. RENEWED APR. 4, 1907.
20 SHEETS—SHEET 7.
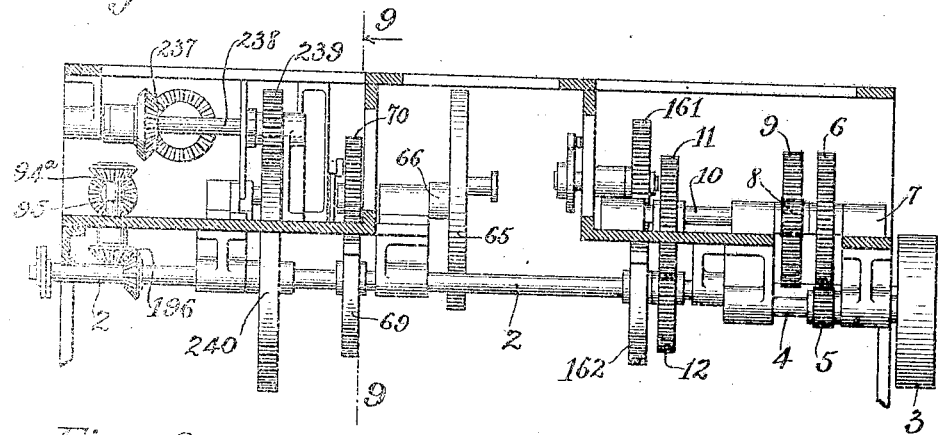
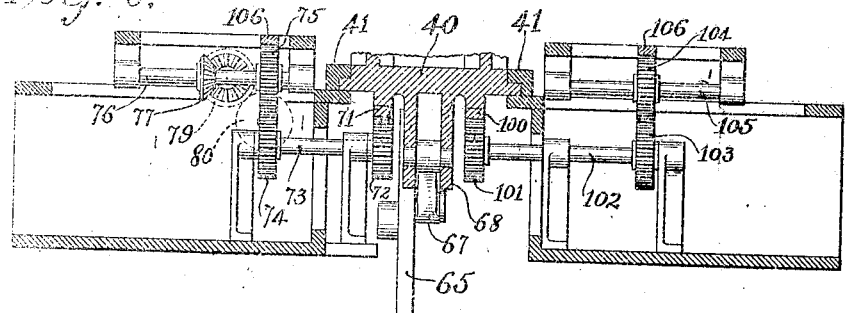
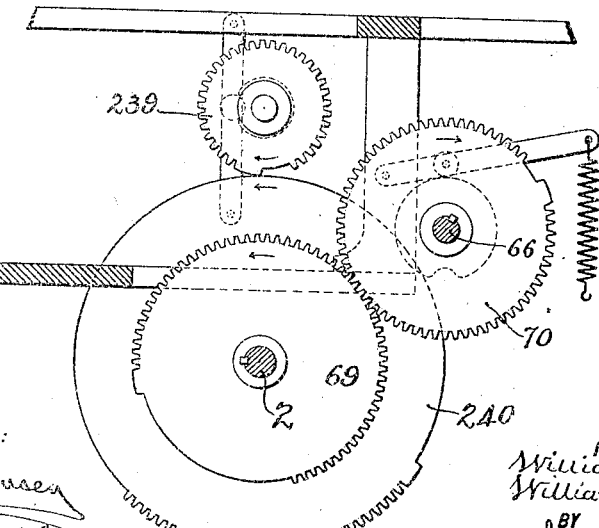

No. 876,485.

PATENTED JAN. 14, 1908.

W. T. McRAE & W. W. CANBY.
BOX MAKING MACHINE.
APPLICATION FILED JAN. 9, 1904. RENEWED APR. 4, 1907.

20 SHEETS—SHEET 8.

No. 876,485.

PATENTED JAN. 14, 1908.

W. T. McRAE & W. W. CANBY.
BOX MAKING MACHINE.
APPLICATION FILED JAN. 9, 1904. RENEWED APR. 4, 1907.

20 SHEETS—SHEET 9.

WITNESSES:

INVENTORS:
William T. McRae,
William W. Canby.
BY
Joshua Pusey,
ATTORNEY.

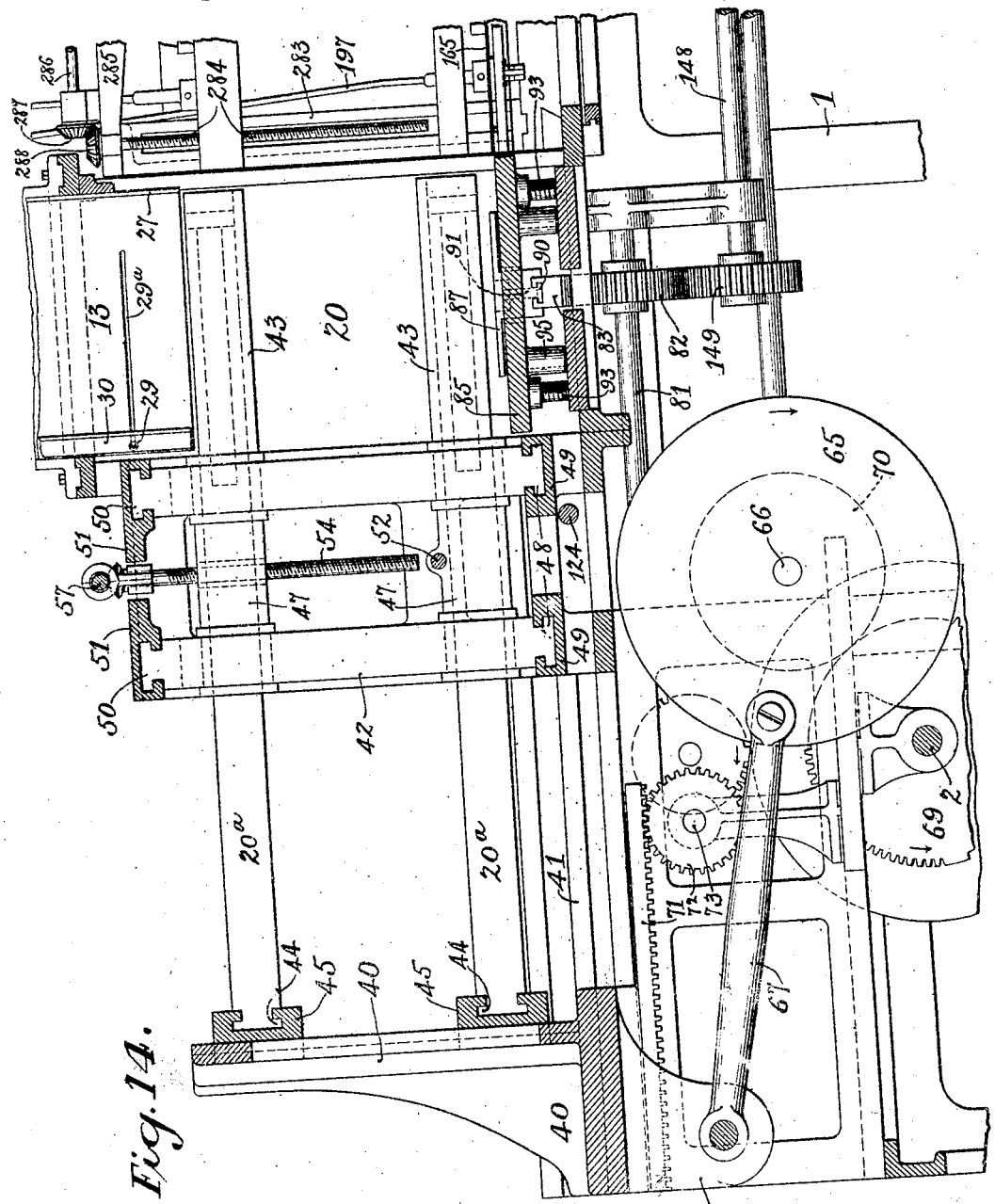

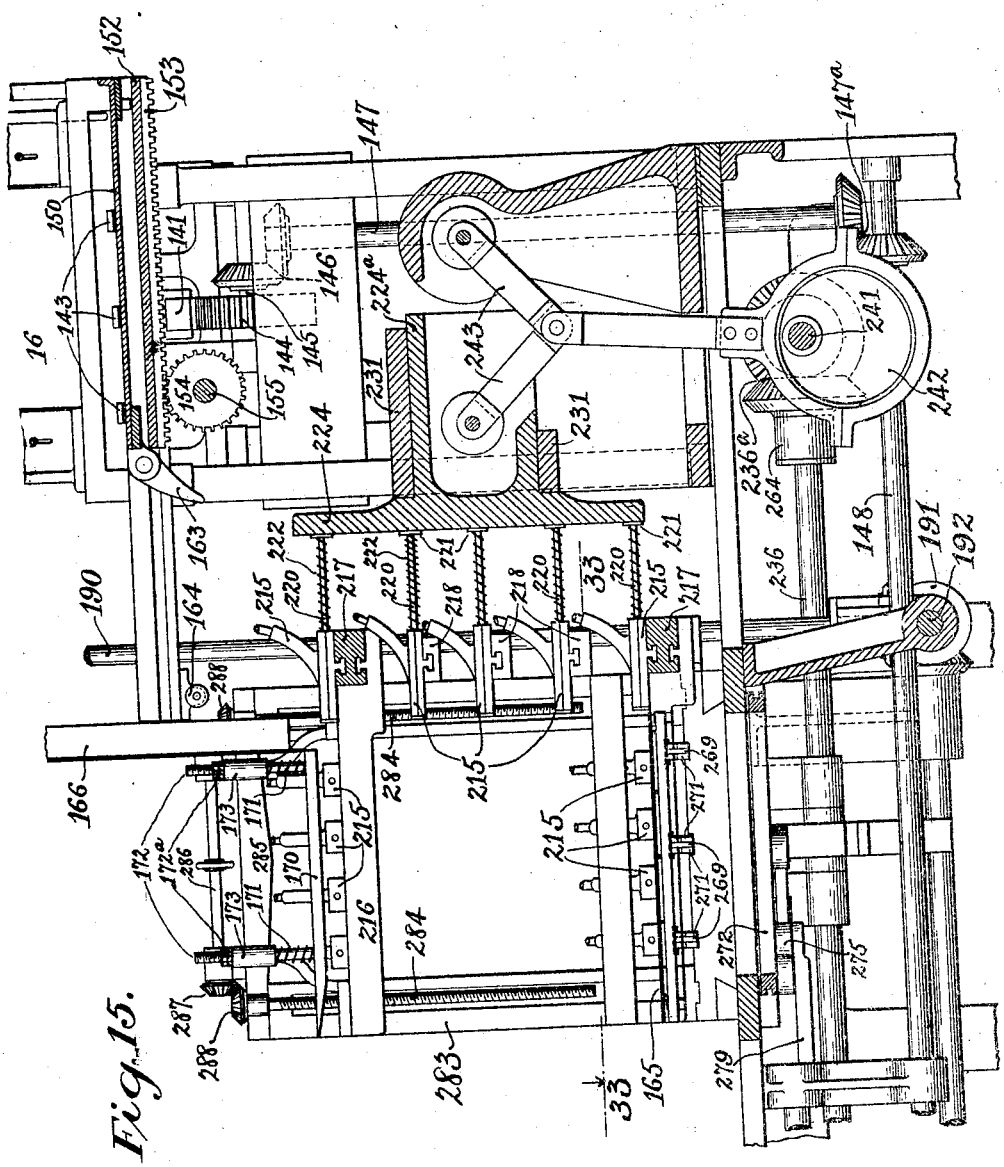

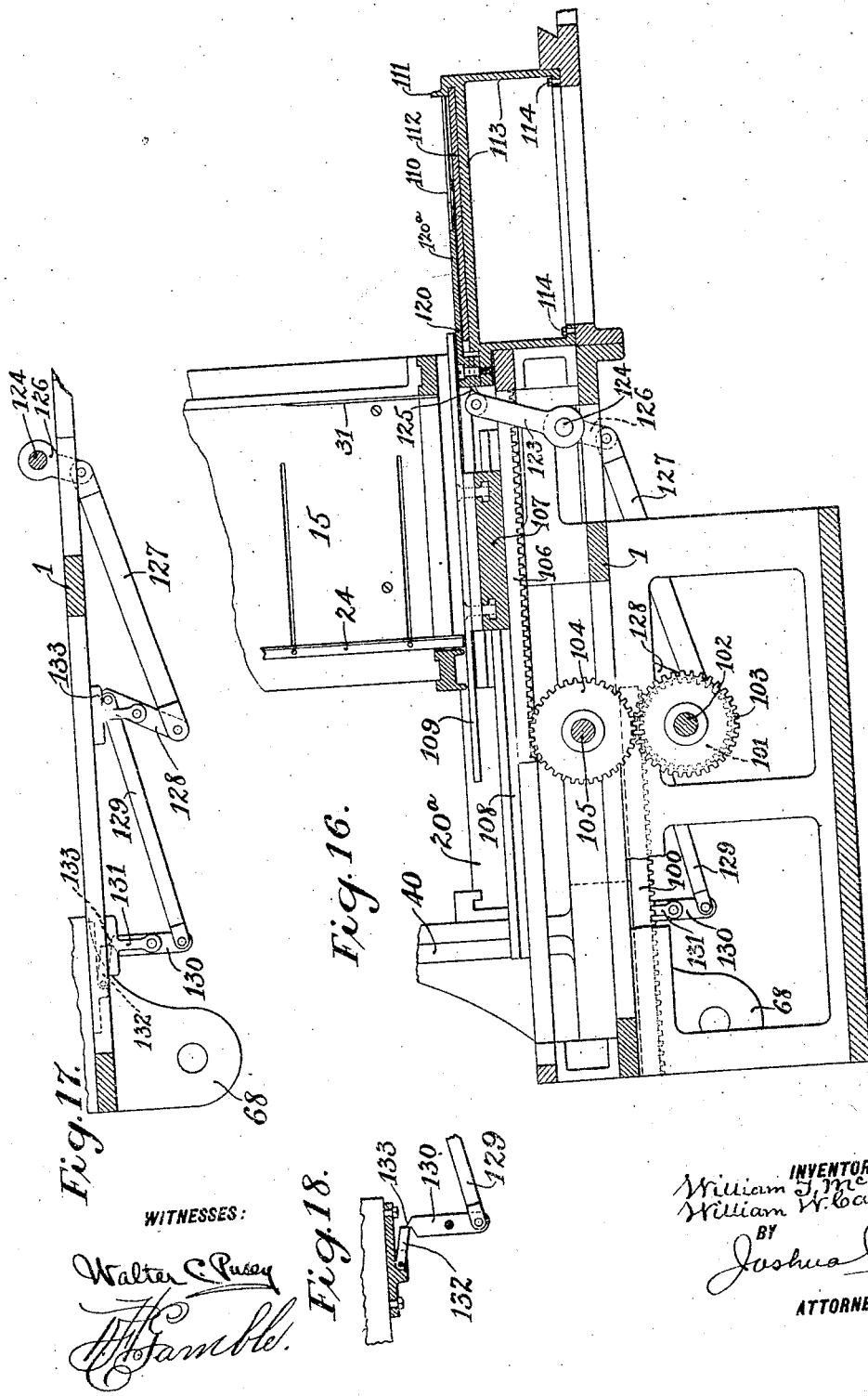

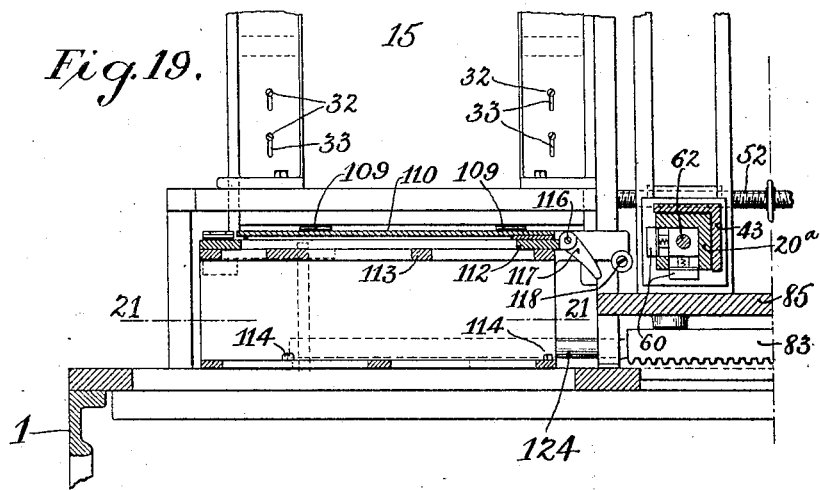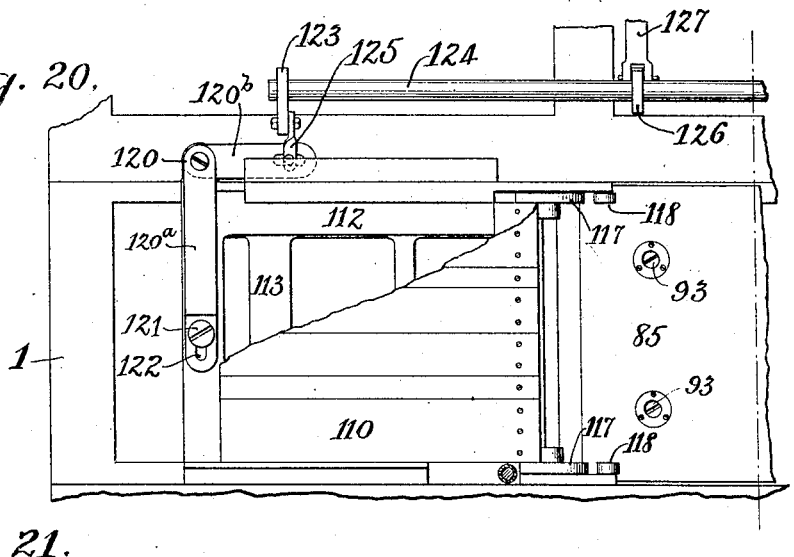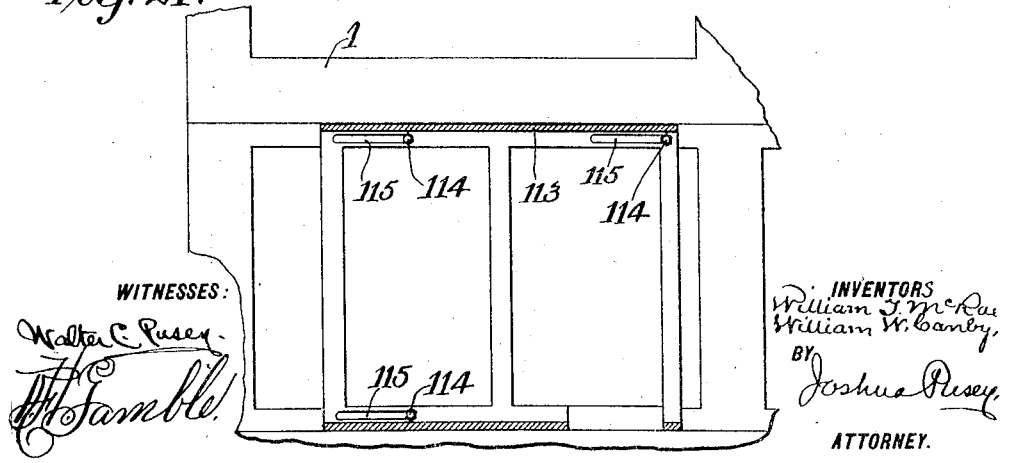

No. 876,485. PATENTED JAN. 14, 1908.
W. T. McRAE & W. W. CANBY.
BOX MAKING MACHINE.
APPLICATION FILED JAN. 9, 1904. RENEWED APR. 4, 1907.
20 SHEETS—SHEET 14.
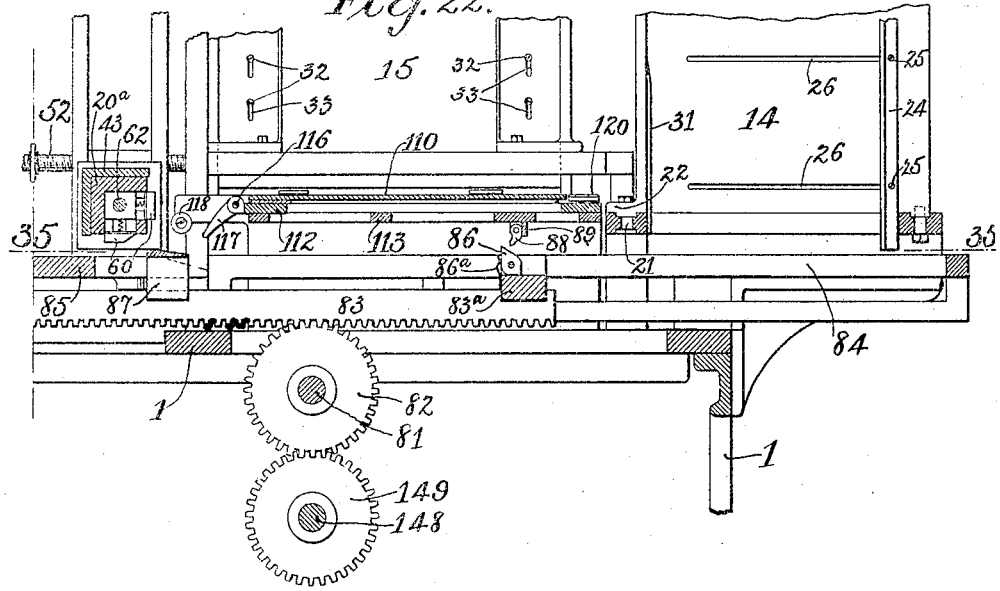
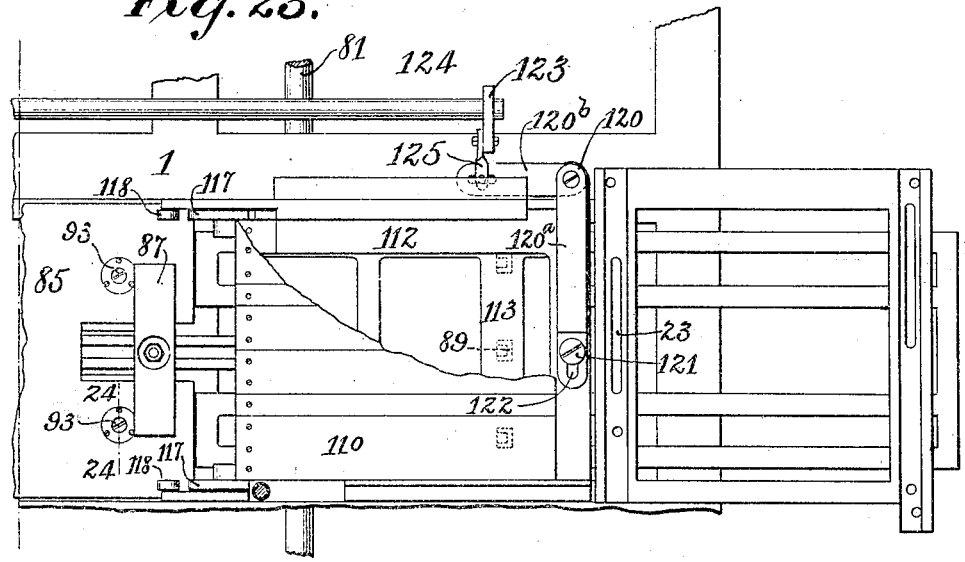
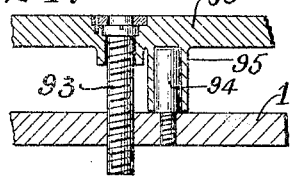

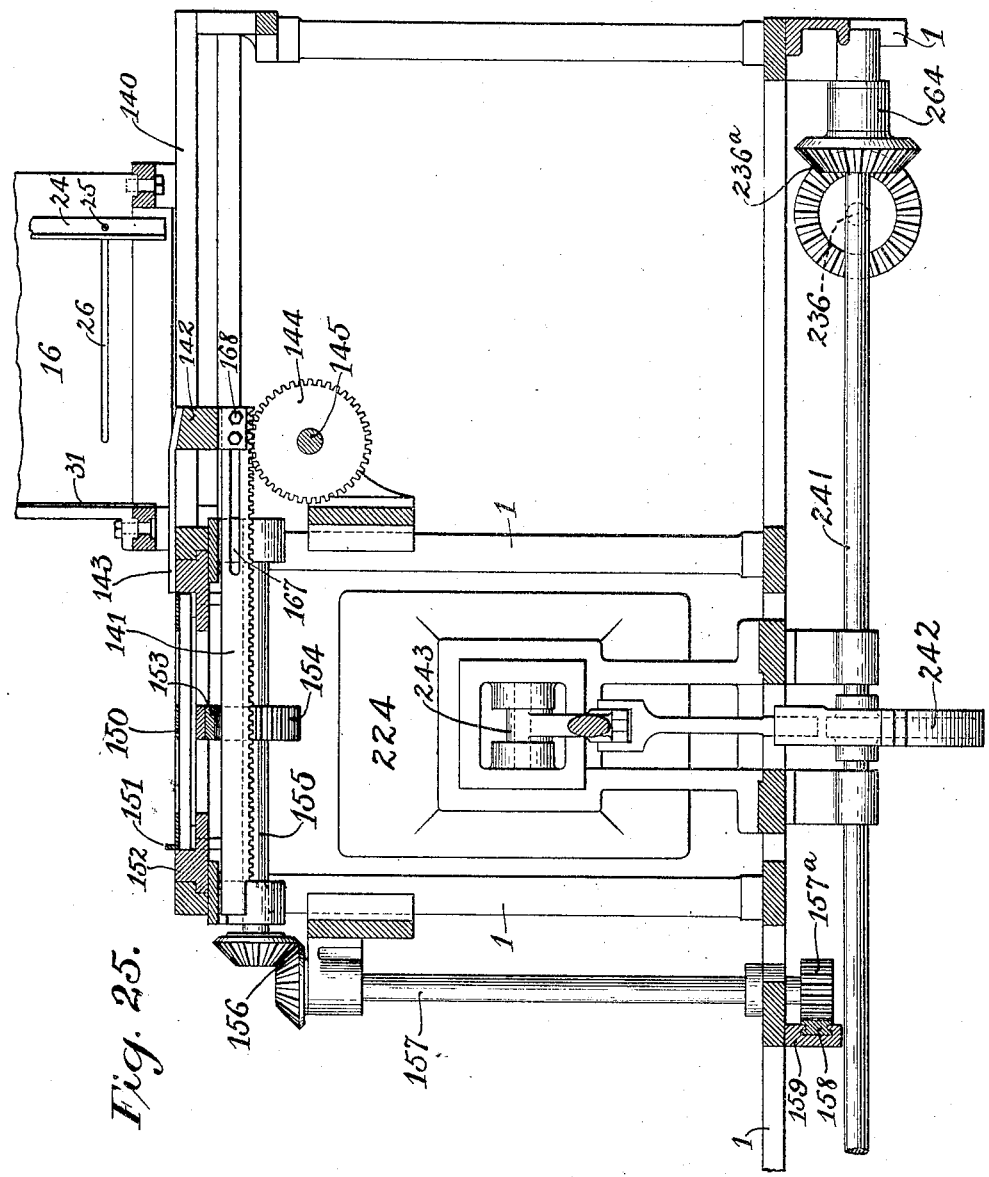

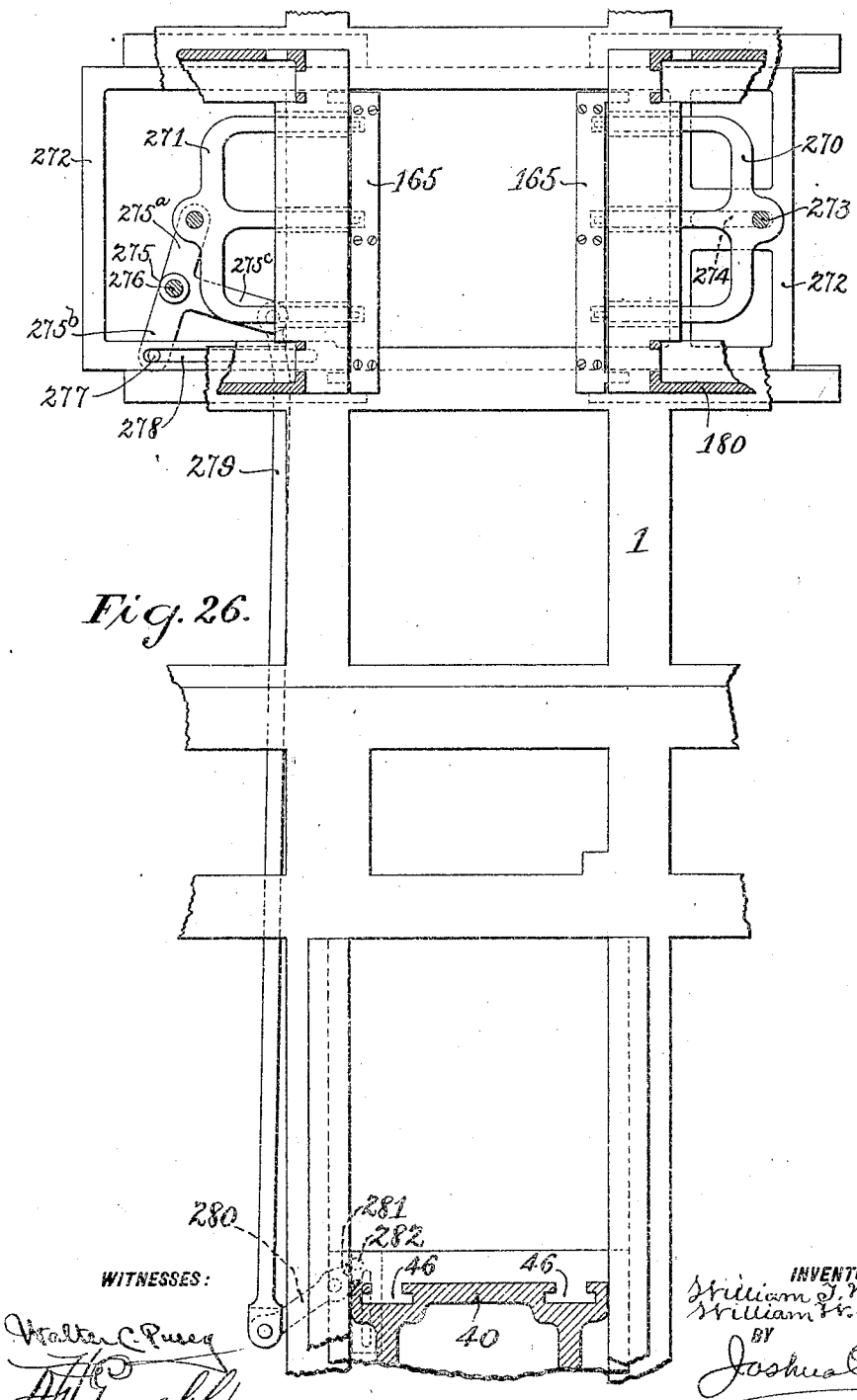

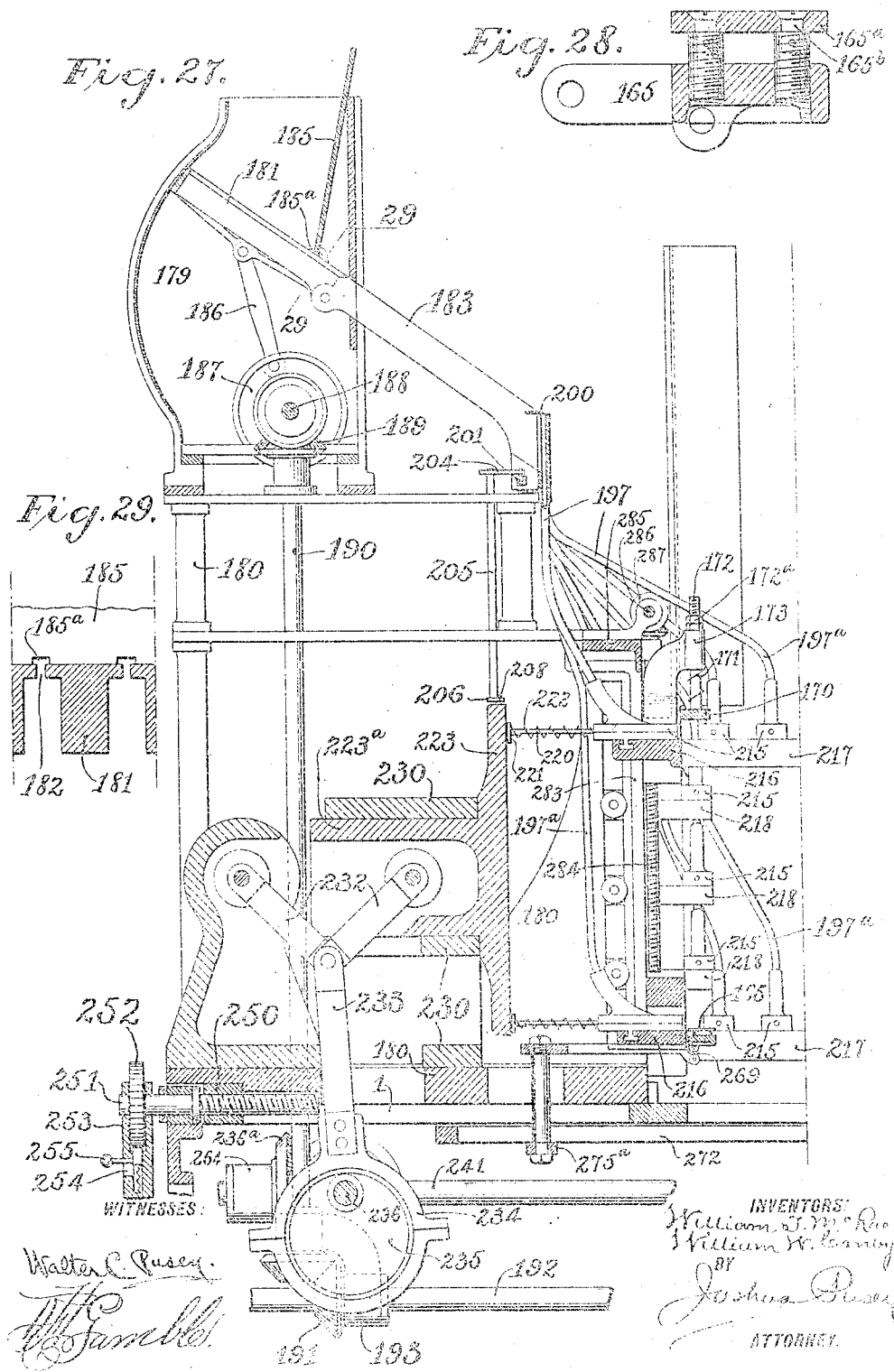

No. 876,485. PATENTED JAN. 14, 1908.
W. T. McRAE & W. W. CANBY.
BOX MAKING MACHINE.
APPLICATION FILED JAN. 9, 1904. RENEWED APR. 4, 1907.
20 SHEETS—SHEET 18.
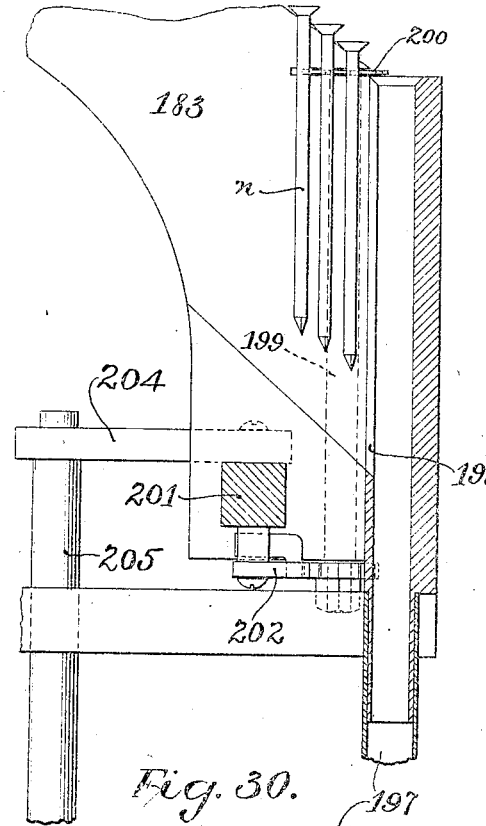
Fig. 30.
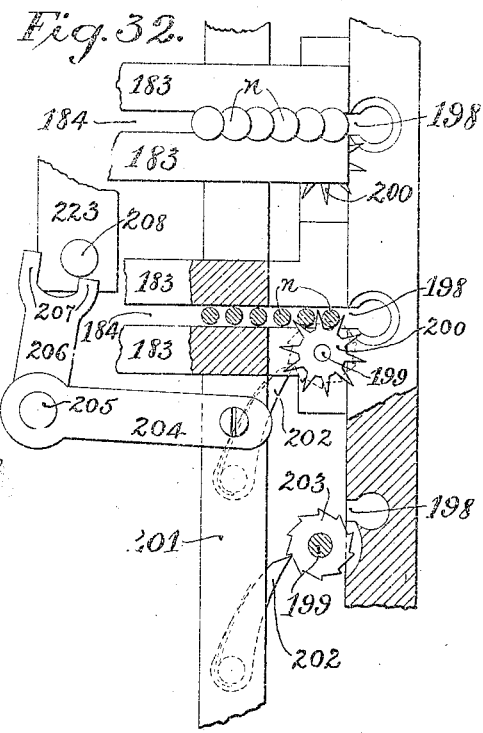
Fig. 32.
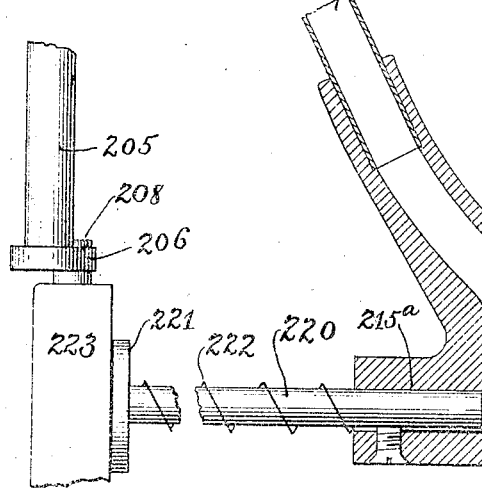
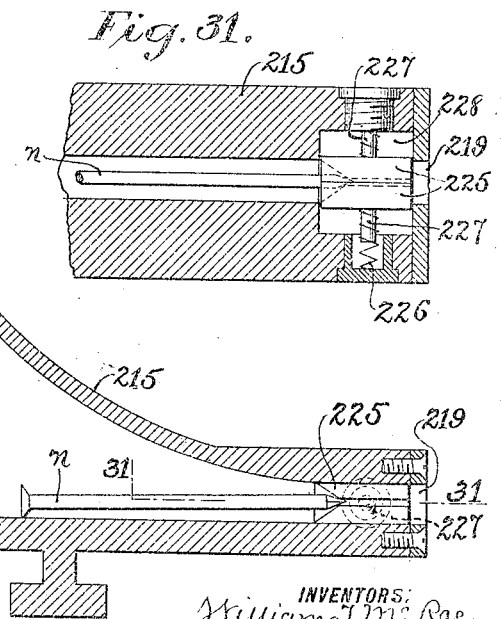
Fig. 31.
WITNESSES:
Walter C. Pusey
H. Gamble
INVENTORS:
William T. McRae
William W. Canby
BY
Joshua Pusey
ATTORNEY.

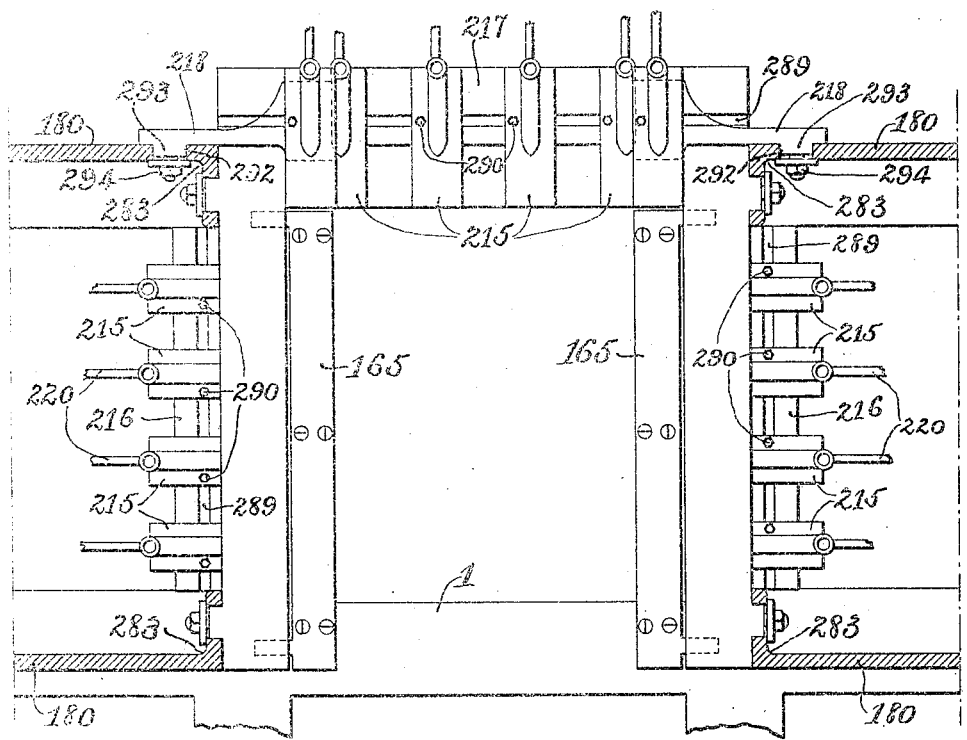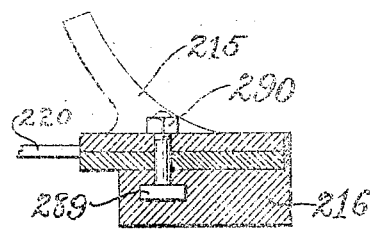

No. 876,485.

PATENTED JAN. 14, 1908.

W. T. McRAE & W. W. CANBY.
BOX MAKING MACHINE.
APPLICATION FILED JAN. 9, 1904. RENEWED APR. 4, 1907.

20 SHEETS—SHEET 20.

WITNESSES:
Walter C. Pusey
H. H. Gamble

INVENTORS:
William T. McRae
William W. Canby
BY
Joshua Pusey
ATTORNEY.

UNITED STATES PATENT OFFICE.

WILLIAM T. McRAE AND WILLIAM W. CANBY, OF PHILADELPHIA, PENNSYLVANIA, ASSIGNORS TO UNIVERSAL BOX MACHINE COMPANY, OF CAMDEN, NEW JERSEY, A CORPORATION OF NEW JERSEY.

BOX-MAKING MACHINE.

No. 876,485.     Specification of Letters Patent.     Patented Jan. 14, 1908.

Application filed January 9, 1904. Serial No. 188,342. Renewed April 4, 1907. Serial No. 366,431.

*To all whom it may concern:*

Be it known that we, WILLIAM T. McREA and WILLIAM W. CANBY, citizens of the United States, residing at the city and county of Philadelphia, in the State of Pennsylvania, have invented certain new and useful Improvements in Box-Making Machines, of which the following is a full, clear, and exact description, reference being had to the accompanying drawings, of which—

Figure 12:
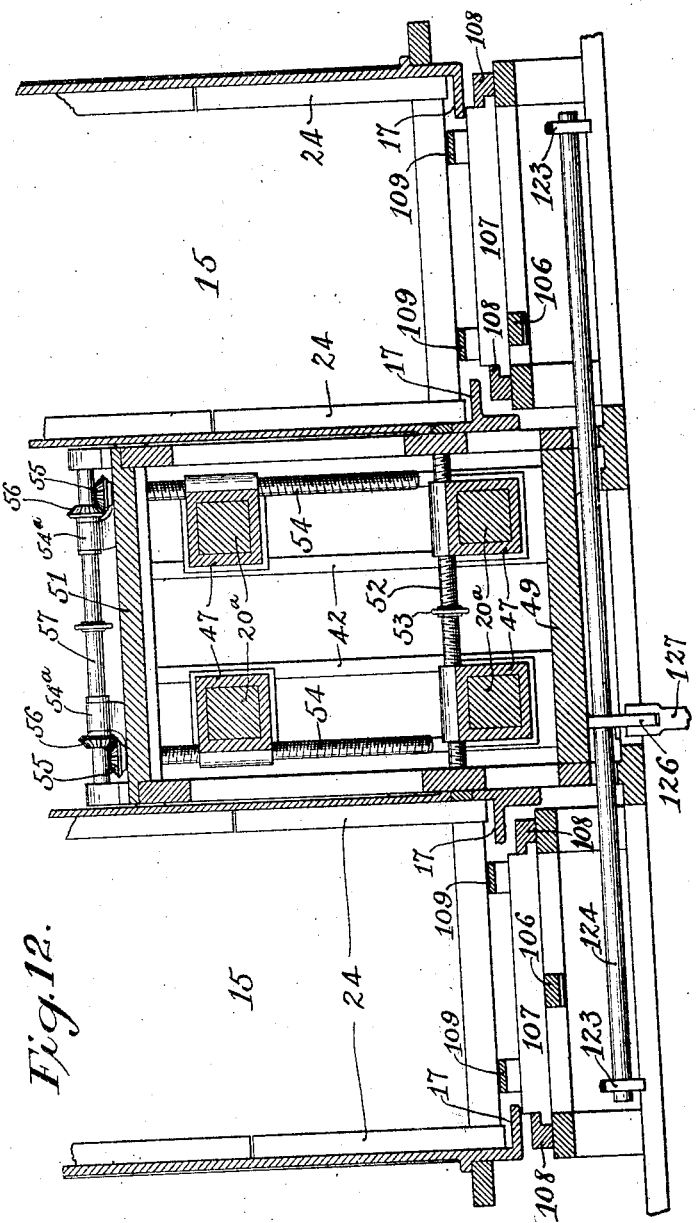
Figure 13:
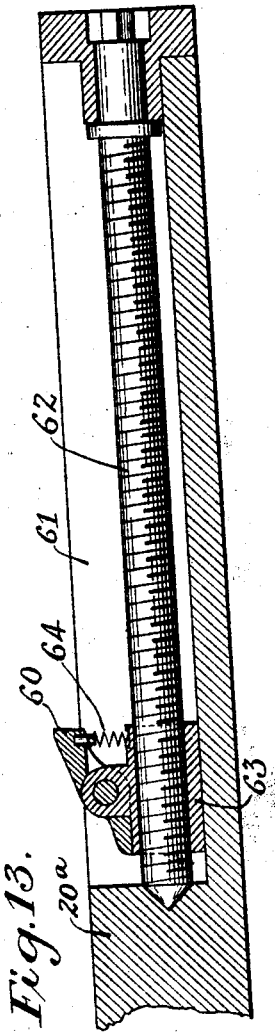
Figure 35:
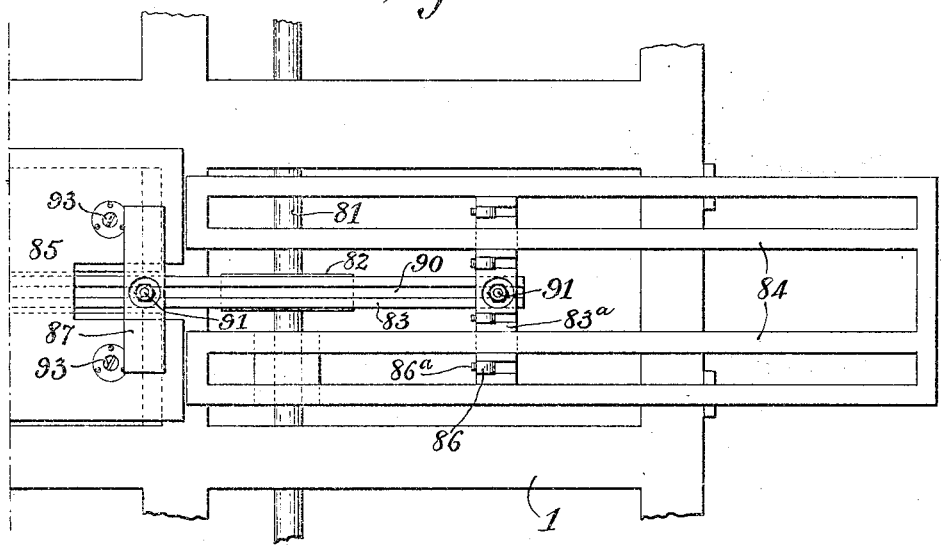
Figure 36:
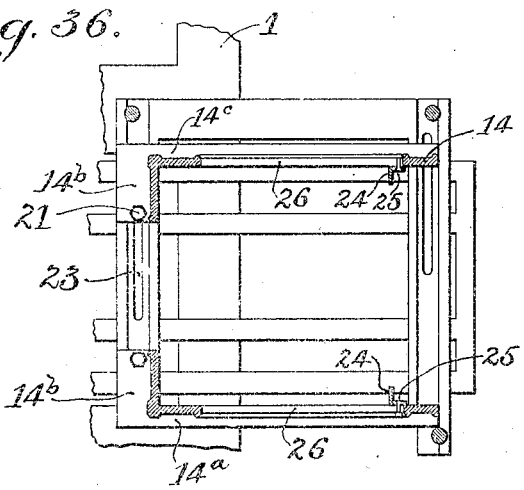

Figure 1 is a general plan view. Fig. 2 is a side elevation. Fig. 2ª is a detail of one of the crank and yoke mechanisms for actuating the side clamping and nail feed carrying frames. Fig. 3 is a front end elevation. Fig. 4 is a rear end elevation. Fig. 5 is a section on line 5—5, Fig. 2, on the plane of the bed-plate of the machine, omitting parts shown in Fig. 6. Fig. 6 is a section on line 6—6, Fig. 2, omitting parts shown in Fig. 5. Figs. 7 and 8 are front views of the driving mechanism, parts omitted in one of said figures being shown in the other. Fig. 9 is a section on line 9—9, Fig. 7. Fig. 10 is a section on line 10—10, Fig. 2. Fig. 11 is a vertical section through the form in advance of the catches for engaging the rear end of the boards and showing in dotted lines the boards assembled around the form. Fig. 12 is a section on line 12—12, Fig. 1. Fig. 13 is an enlarged longitudinal section of one of the form bars, showing one of the said catches, and means for adjusting the same. Figs. 14 and 15 together constitute an enlarged section on line 14—15, Fig. 1. Fig. 16, is a section, enlarged, on line 16—16, Fig. 1. Fig. 17 is a detail of a portion of the mechanism for operating the side-board tilting tables. Fig. 18 is a detail illustrating more clearly a part of the mechanism shown in Fig. 17. Fig. 19 is a section on line 19—19, Fig. 1. Fig. 20 is a plan view of Fig. 19. Fig. 21 is a section on line 21—21, Fig. 19. Fig. 22 is a section on line 22—22, Fig. 1. Fig. 23 is a plan of Fig. 22. Fig. 24 is an enlarged section on line 24—24, Fig. 23. Fig. 25 is a section, enlarged on line 25—25, Fig. 1, showing the mechanism for bringing the bottom end board in position. Fig. 26 is a skeleton plan of the bed-plate of the machine frame, showing the drop-plate mechanism for discharging the finished box from the machine. Fig. 27, is an enlarged sectional elevation on line 27—27, Fig. 1, of one of the nailing mechanisms. Fig. 28 is an enlarged sectional detail of one of the supporting and box discharging drop-plates. Fig. 29 is an enlarged section on line 29—29, Fig. 27. Fig. 30, is an enlarged sectional elevation of the nail-feeding mechanism, broken away. Fig. 31, is a section on line 31—31, Fig. 30. Fig. 32 is a view, partly in plan and partly in section, of the star-wheel nail feeding mechanism. Fig. 33 is an enlarged section on line 33—33, Fig. 15. Fig. 34 is a detail showing the means for spacing the nail-holders, and holding the same in position. Fig. 35 is a plan view, taken on line 35—35, Fig. 22. Fig. 36 is a horizontal section of the hopper for the lower end boards, showing the means for adjusting the same for boards of different size.

This invention relates to that kind of machines for making rectangular boxes of wood, in which the boards that are to form the box are assembled in the machine in proper relative position and are then nailed together by suitable mechanism.

The main object of the invention is to provide an improved machine in which all the operations requisite to produce the boxes are accomplished by suitably timed mechanisms all that is necessary to be done by the attendant, after the machine has been started, being to keep the same supplied with the material,—to wit, boards and nails,—for making the boxes.

Another object of the invention is to provide such a machine that is adapted to be adjusted to make boxes of different sizes.

In this machine, the boards which are to constitute respectively the ends, sides and bottom of the completed box, are contained in receptacles, or hoppers, whence they are brought by suitable mechanisms, assembled and held in proper juxtaposition, and are then secured together by nails, driven by mechanisms, which nails are brought from hoppers by mechanisms, and the finished box is then discharged from the machine.

The invention comprises various devices and combinations of mechanism whereby the foregoing objects and results are effected, as hereinafter fully described and particularly pointed out.

Referring to the accompanying drawings, 1 denotes the general frame of the machine, that supports the various devices and mechanisms. 2 is the main shaft from which all of the movable parts of the machine receive their motions. This shaft is driven from a source of power by a belt (not shown) that passes over a pulley, 3, on a shaft, 4, which carries a pinion, 5, that engages a gear, 6, on a countershaft, 7, having thereon a pinion, 8, that engages a gear, 9, on a second countershaft, 10, which has a gear, 11, that engages a gear, 12, on said main shaft, 2.

13 Figs. 1, 2, 3, 4, and 14, is the hopper for containing the boards for the upper end of the box to be made; 14, the hopper for the lower end boards; 15 the respective hoppers for the two side-boards; and 16, the hopper for the bottom boards. These several hoppers occupy a vertical position and are of similar form and construction, and are adapted to receive piles of the boards laid flatwise. They are made preferably, adjustable as hereinafter described, in order to adapt them for the reception of boards of different dimensions in accordance with the size of the boxes to be made. The upper end board hopper, 13, is located at about the middle of the machine; the lower end board hopper, 14, at one side of the machine and in line substantially with hopper, 13; the two side-board hoppers, 15, respectively towards the front and sides of the machine and the bottom board hopper, 16 at the side of the rear end of the machine; all as clearly seen in Fig. 1. The lower boards in hoppers, 15, rest normally upon inwardly projecting flanges, 17, Figs. 3 and 12, at the bottom of the hoppers; and the lower boards of hoppers 14 and 16 rest upon beds or plates hereinafter referred to, while the lowermost board of the pile in the hopper, 13 normally rests upon the top of the upper bars of a rectangular skeleton frame 20, hereinafter termed the "form", the box frames being formed around the same.

The several hoppers are adjustable for boards of different sizes, that is, to correspond with the dimensions of the boxes to be made by the machine. The construction whereby these adjustments may be made is substantially the same for each hopper, the change in the dimensions of the upper end board hopper, 13, being, however, made by independent adjustments of the sides thereof, while the adjustments of the two contiguous sides only are made of the other hoppers. The said construction is as follows:—reference being had, for example, more particularly to Figs. 2, 4, 12, 14, 16, 23, 24, 25, and 36, the latter being a full horizontal section of the lower end board hopper, 14. The hopper is supported by a part of the frame of the machine. One of its sides, 14ª, and a contiguous part of the side, 14ᵇ, integral therewith, that is, the inner side (towards the hopper 13) is rigidly secured to the machine frame, while the opposite side, 14ᶜ, and part of side, 14ᵇ, is secured to the said frame by means of bolts, 21, that pass through feet, 22, and a longitudinal slot, 23, in the machine frame, one of which bolts and feet being shown in Fig. 36.

The outer side of the hopper is formed by a series of angle-bars, 24, that are secured to the contiguous sides of the hopper, by means of bolts, 25, that pass through horizontal slots, 26, in the last-mentioned sides. By loosening the nuts on bolts, 21, the said part secured thereby may be adjusted inwardly or outwardly, as may be required, thus changing the width of the hopper in that direction. And by loosening the nuts on bolts, 25, the angle-bars, 24, may be suitably adjusted to increase or diminish the width of the hopper in that direction.

The hoppers, 15, have their rear and outer sides adjustable, and the bottom-board hopper, 16, has its outer and forward sides adjustable. The central or upper end-board hopper, 13, has the rear and two outer sides adjustable. As when the form, 20 is adjusted vertically, that is the two upper bars thereof, the distance from the lower end of hopper, 13, to said bars varies, it is necessary, in order to insure the proper position of registry of the boards upon said bars that that hopper shall be, so to say, vertically extensible, as well as adjustable laterally, as above-mentioned. To this end, we place on the interior of each side of said hopper, 13, a plate, 27, Figs. 2, 14, and 4, that is vertically adjustable by means of clamp-bolts 28, that are secured to said plate, and pass through vertical slots, 28ª, Fig. 2, in the side of the hopper. Secured to the rear of said plate, by means of screw-clamp-bolts, 29, that pass through horizontal slots, 29ª, in the plate is an angle-bar, 30, similar to the angle-bars (24) of the other hoppers. It will be seen that by loosening the bolts, 28, the plate, 27, may be adjusted vertically as required and by loosening the bolts, 29, the angle-bars may be adjusted back or forth, and as the sides of the hopper to which said plates are secured are adjustable by the same means as the lower end board and side board hoppers, as before described, the said sides with the plates, 27, may be shifted inwardly or outwardly as required.

On the forward side (that is, the side towards which the board is withdrawn from the hopper, as hereinafter described) of each of the hoppers, except the upper end board hopper, 13, is a plate, 31, Figs. 16 and 22. This plate is vertically adjustable to suit boards of different thickness so as to insure that the lowermost board only can pass from the hopper; that is to say, so that the vertical width of the opening below the hopper side shall be sufficient to allow the passage of the board and not also the next one above, whatever be the thickness of the boards. These plates are secured to the side of the hoppers by means of clamp screw-bolts, 32, that pass through vertical slots, 33, Figs. 2, 19, and 22 in the side of the hopper. By loosening the nuts on said bolts, said plate may be adjusted as required. The vertical width of the corresponding opening for the passage of the lowermost board of the upper endboard hopper, 13, when the board is pushed forward by the form, 20, as hereinafter described, is regulated by means of the adjustable plates, 27, which, as previously described, serve to bring the bottom of said hopper into suitable proximity to the two upper form-bars at any vertical adjustment of the latter.

Referring now to the construction of the form, 20, the same comprises four rectangular bars, 20ª, that occupy corners respectively of an imaginary rectangle, and secured to and extend forward from a vertical head, 40 (hereinafter termed the carriage,) which is adapted to slide longitudinally in a horizontal plane in guideways, 41, of the frame of the machine. The said form bars, 20ª pass through suitable guideways of a vertical frame, 42, rising from the frame or bed of the machine, and the portion of the bars projecting forward of said frame, 42 (and which portion of the bars underlie the hopper, 13) are, in the present instance, supported and guided by L-shaped arms, 43, that are secured to or may be integral with the frame, 42. The two upper ones of said arms are open at the top and outer sides, as seen in Fig. 11; that is, the horizontal limb of each of the two arms next to the lower side of the form-bar, and the vertical limb on the inner side, and also the two lower ones of said arms are open at the bottom and outer sides, as also seen in Fig. 11. The two upper bars of the form constitute in effect the bottom of the hopper, 13, as they support the pile of upper end boards within the latter, as indicated by dotted lines in Fig. 11, in which $a$ is the lower board of such a pile, $b$ being the lower end board, and $c$ the two side boards.

In order to enable the dimensions of the form, 20, to be varied both vertically and laterally, so as to adapt it for use in the making of boxes of different sizes, the rear ends of the bars, 20ª, are made T-shaped and entered into correspondingly shaped grooves, 44, in transverse horizontal upper and lower bars, 45, of the carriage, 40; the lower bars being stationary, and the upper one vertically slidable in dovetail or T-guideways, 46 of the said carriage. The two upper and lower form bars constituting one side of the form, 20 respectively, pass through guide-blocks, 47, the lower one of which is fixed to that side of the aforesaid frame, 42, and the upper one is adapted to slide vertically in the latter. The two form bars on the opposite side pass through similar guideways or blocks, also marked, 47. The L-shaped guide-arms or supports, 43, are an integral part of said blocks respectively. One side of the frame, 42, is independent of the other side, and each is mounted so as to be capable of being slid transversely in suitable guide-ways, Fig. 14, the lower end of each side in guideways 48 of part, 49, of the machine frame, and the upper end in similar guideways, 50, of a top-plate, 51, which is a fixed part of the machine-frame. In the present instance, the ends of the said sides, 42, are T-shaped and the guideways 48 and 50, of corresponding shape, as clearly seen in Fig. 14. The two sides are connected by a right and left screw, 52, Fig. 12, whose ends are journaled in a part of the machine frame. For convenience of rotating said screw, it is provided with a milled collar, 53.

Passing through screw-threaded holes in the guide-blocks, 47, respectively of the two upper form-bars are vertical screw-shafts, 54, that are journaled in elbows, 54ª. Each of said shafts has at its upper end a bevel-gear, 55, that engages a gear, 56, of a horizontal shaft, 57, that is journaled in bearings of plate, 51, and has a milled collar for convenient turning. The elbows, 54, are slidable longitudinally on shaft, 57.

It will be obvious that by turning the screw-shaft, 52 the width of the form may be adjusted as required, the several bars, 20ª, sliding in the guide-grooves of the bars of the carriage, 40, and the sides of the frame, 42, in the guideways, 48 and 50. Also that by turning the shaft, 57, i. e.—rotating the vertical screw-shafts, 54, the vertical dimensions of the form may be adjusted; the two upper bars moving simultaneously up or down, as the case may be, upon the said vertical shafts; the upper one of the cross-bars, 45, to which the ends of said bars are connected correspondingly sliding in the carriage, 40.

Each of the form-bars, 20ª is equipped with two similar, spring-controlled dogs, or catches, 60, pivoted thereto and projecting normally beyond the sides of the said bars; there being one of these catches on the upper side and one on the outer side of each of the upper two of said bars, and one on the lower side and one on the outer side of each of the two lower bars, as seen in Fig. 11. Their position is such that when the form is advanced from the retracted position shown in the drawings, they will impinge against the rear edges of the several boards, respectively, then assembled around the form, as hereinafter described. These catches are constructed as follows,—and are adjusted lengthwise of the form-bars as it may be required by the particular size of the box to be made in the machine. Particular reference is had to the enlarged sectional view, Fig. 13. The outer side of the form-bar, 20ª, has a slot, 61, in which is a rotatable screw-bolt, 62, upon which is a nut, 63, to which the catch, 60 is pivoted and is maintained normally projecting beyond the surface of the form-bar by a spiral spring, 64, the extent of projection being limited by a rear lug or catch that bears against the nut, 63. By turning the bolt, 62, the nut, and consequently, the catch, may be adjusted to the required position longitudinally of the form-bar.

The carriage, 40, and adjuncts, is caused to reciprocate, at predetermined times, by means of a crank-disk, 65, upon a rotatable shaft, 66, and a connecting rod, 67, that is pivoted to said disk and to a lug, 68, depending from the carriage, as seen in Fig. 14; the said shaft being driven from the main shaft, 2, by a mutilated gear, 69, on the latter that engages a mutilated gear, 70, on shaft, 66. See Figs. 7 and 9. The purpose of these mutilated gears is to effect suitable rests, or timing, of the movements of the carriage 40, with relation to the mechanism for carrying in the side-boards and lower-end board, as hereinafter described. In the present instance, the devices for withdrawing the lower end-board and the two side-boards, respectively, from their hoppers, and bringing them thence into proper position with relation to the form, 20, are caused to be actuated by the movement of said carriage through intermediate mechanisms as follows:—reference being had first to the mechanism operating upon the lower end-board within the hopper, 14. On the under side of said carriage, Figs. 8 and 14, is a rack, 71, whose teeth engage those of a gear, 72, on a shaft 73, that also carries a gear, which engages a gear, 75, on a shaft, 76, having a bevel-gear connection, 77, with a shaft, 78, which latter shaft has gear, 79, that engages a gear, 80, on a shaft, 81, Figs. 6 and 14. The last-mentioned shaft carries a gear, 82, Fig. 14, that engages the teeth of a rack-bar, 83. The lower one of the pile of boards within the hopper (14) rests upon a skeleton frame, 84, Fig. 35, constituting the bottom of the hopper, which frame extends inwardly adjacent to a horizontal plate 85, hereinafter referred to, beneath the former-bars, 20ª. The upper surface of said frame and plate are substantially in the same horizontal plane. The rack, 83, has, at its outer end, a cross-head, 83, Figs. 22 and 35, to which are pivoted spring-controlled catches, 86. These catches are normally maintained in the upright position by springs, 86ª, Fig. 22, and a suitable stop for limiting their backward rotation. They, the said catches, project up through the longitudinal slots of the frame, 84, that is, above the level of the top of the latter. When the rack, 83, is in the outward or retracted position, the said catches are outside of the hopper (14) so that when said rack is advanced inwardly, the catches will engage the edge of the lower board in the hopper. The said rack-bar has secured thereto a cross-head, 87 whose top is backwardly beveled, as seen in Fig. 22, and is at a suitable predetermined distance from the catches, 86.

Pivoted on the under side of one of two longitudinally adjustable supports or beds, hereinafter referred to and marked 113, in Fig. 22, are depending gravity dogs, 88, that normally project slightly above the plane of the top of said bar, 86, as seen in Fig. 22, in which position they are maintained normally by gravity and a stop, 89, for limiting their backward swing. When the rack, 83, is advanced to the full extent of its movement in that direction, the catches, 86, engaging the lower board in the hopper, 14, carry the board forward, that is inwardly upon the frame, 84 (there being an opening in the lower end of the forward side of the hopper to permit the board to pass out) until it passes beyond the dogs, 88. On the return movement of the rack, the head, 87, slides against the under side of the board, the said dogs (88) preventing the board from being slid back by the friction of said bar. On the next inward movement of the rack, 83, the rear edge of the board that had been advanced as described, and which has been lying upon the frame, 84, is caught by the cross-head, 87, and is thereby carried onto the plate, 85, in proper position to become the lower end board of the box to be made, that is, in registry with the upper end board then lying upon the form-bars, 20ª. At the same time, the lower board in the hopper, 14, is brought into the place or position vacated by the first board, and so on consecutively at the proper predetermined times.

By the construction just described, we are enabled to convey a board on to the plate, 85, at each reciprocation of the rack-bar, obviating the use of such bar of double the length and double the stroke in order to carry the board the entire distance from the hopper into position onto said plate. In order to adapt these parts of the machine for boards of different widths, the cross-heads, 83ª and 87, are longitudinally adjustable on the rack, 83, the former having lugs on the under side that are slidable in a guide-way, 90, Fig. 35; they, the cross-heads, being held in any adjustment by means of bolts, 91, having heads adapted to slide in said guide-way. By loosening nuts, on the bolts, 91, the cross-heads may be shifted to the required positions. The gravity dogs, 88, adjust with the said support, 113. We make the plate, 85, vertically adjustable to suit boards of different thickness. This is done by having said plate separate from the fixed bed, of part of the machine which supports it, and securing it, the plate, to adjustable screws, 93, Fig. 24, there being also guide-posts, 94, rising from the said bed and entered into bosses, 95, on the under side of the plate, 85; one of which screws and guide-posts being clearly seen in Fig. 24. To insure the sliding of the board from the frame, 84, onto the plate, 85 at any adjustment of the height of the latter we bevel the edge of said plate, adjacent to the end of frame, 84, as seen in Fig. 22.

Having described the mechanism for bringing the lower end board into the required position with relation to the form, 20, we shall proceed to describe the mechanism for conveying the boards that are to form the two sides of the box, from their respective hoppers, 15, into proper position with relation to the form, and in registry with the two end boards.

As the mechanism operating upon the boards of one of said hoppers is substantially identical with that for the boards of the other hopper, we shall particularly describe but one of the mechanisms, the like parts of said mechanisms being designated by like numerals.

On the under side of the carriage, 40, is a rack, 100, Figs. 3, 8, 10, and 16, with which engages a gear, 101, on a shaft, 102, which shaft carries a gear, 103. This gear engages a gear, 104, on a shaft, 105. The gear, 104, and said gear, 75, respectively engage horizontal racks, 106, of plates 107, Fig. 16, one of which latter is part of the mechanism acting upon one of the side-boards and the other upon the other side-board. We now proceed to describe the remainder of the mechanism for one side-board, that for the other side-board being identical with the first, as above stated.

The plate, 107, which is adapted to slide longitudinally in guideways, 108, of a part of the frame of the machine, has on its upper side bars 109, Figs. 1, 2, 10, and 16, in the plane of the bottom board resting upon the aforesaid flanges, 17, of the hopper, 15, so that when the plate, 107, is in the forward position, the forward end of said bars will be in position to impinge against the edge of said board when said plate is advanced as hereinafter described. The under side of the bar, 109, is in the same plane, or slightly above that of the top of a tilting table, 110, as seen in Figs. 19, 20, 22, and 23.

In the drawings, the carriage, 40, being in the retracted position, the bars 109 are in the position they occupy immediately after they have pushed a board on to the table, 110. When, however, the carriage moves forward, the plate, and consequently the bar, 109, will, through the rack and gear mechanism before described, be retracted, and when the carriage reaches the limit of its retracted movement, the forward end of the bar will have passed beyond the rear side of the hopper, 15. Whereupon, the then bottom board, that had been resting upon the said bar, will have dropped upon the flanges, 17. Upon the next forward movement of the carriage, 40, the bars impinging against the edge of said board push it on to the table against a stop-bar, 111, Fig. 16.

The table, 110, overlies and is supported by a carrier 112, that is adapted to slide longitudinally in suitable guide-ways of a part of the frame of the machine, or rather, in this instance, of a longitudinally adjustable support, 113 (hereinbefore referred to) that rests upon said frame part, being secured thereto by means of clamp-screw bolts, 114, Figs. 16, 19 and 21, which pass through slots, 115, in said frame part. The end of table, 110, toward the form, 20, is pivoted on studs, 116, that are secured to the carrier, 112; and projecting forward and downwardly from that end of the table, are arms, 117, whose free end portions are in line with studs or rollers, 118, upon the support 113, which rollers are near the sides of the lower bar of the form on that side, as seen in Figs. 19, 20, and 22; the latter figure showing the said parts for one of the side boards and Figs. 19 and 20 those for the opposite side-boards. Thus the arms, 117, constitute in effect, the short arm and the table the long arm of a pivoted lever. The carrier, 112 is adapted to be reciprocated with relation to the rollers, 118, and on its forward reciprocation,—which is timed to occur immediately after a board has been delivered on to the table, 110, as before described,—the arms, 117, contacting with said rollers, 118, cause the table to tilt upwardly on its pivots and thus up-end the board against the side of the form-bars, and in proper relative registry with the upper and lower end-boards; the two side boards being brought into position at substantially the same time. The side boards, when up-ended, drop a short distance and rest upon the aforesaid plate, 85, the board on the side next to the then incoming lower end board first dropping on that board, and then on said plate, after the lower end board has been pushed entirely on to said plate.

The mechanism for imparting the required reciprocations to the carrier, 112, is as follows, reference being had particularly to Figs. 6, 16, 17, 18 and 20:—Pivoted to the frame, 113, is a bell-crank lever, 120, one arm, 120$^a$, of which is connected to the upper side of the rear end of the carrier, 112, by a screw or pin, 121, that passes through a slot, 122 in the arm, 120$^a$ (see Figs. 20 and 23). The other arm, 120$^b$, of said lever, which is in a lower plane than the first arm, is connected to the crank, 123, of a rock-shaft, 124, by a suitable link connection, 125. On this shaft is a crank, 126, that is pivotally connected by a rod, 127, with the lower arm of a rock-lever, 128, whose upper arm is connected to a rod, 127, with the lower arm of a rock-lever, 128, whose upper arm is connected by a like rod, 129, to the lower arm of a lever, 130, that is pivoted on a support 131, depending from a part of the frame of the machine, see Figs. 16, 17, and 18.

Pivoted to the under side of the carriage, 40, is a gravity dog, 132, Fig. 18, which when the upper arm of lever, 130 is in the vertical position, as in the drawings, and the said carriage is moved forward, engages the free end of said arm, and through the described connections between said lever and the carrier, 111, causes the latter to move inwardly and the arms, 117, impinging against the rollers, 118, tilt the table, 110, and consequently the board thereon, to a vertical position. As the carriage continues its forward movement the dog, 132, impinges against a projection, 133, of the upper end of lever, 128 (which lever has been thrown in the vertical position) and thereby returns the said table to the horizontal position.

The lower end-board, b, Fig. 11, and the two side-boards, c, c, having been brought into proper juxta-position around the former 20, the side-boards being retained in the vertical position respectively by the up-ended tables, 110,—the several boards, including the upper end board lying on the upper form-bars, without changing their relative position, are now carried forward against the board which is to constitute the bottom of the box (which board has been brought from hopper, 16, into suitable position by the mechanism hereinafter described) and in position for the nailing operation, also to be described. As hereinbefore mentioned the said carrying forward of the boards is effected by the advance of the carriage, 40, with the form, 20, whose catcher, 60, then engage the boards.

The mechanism,—which is generally similar to that for the side-boards,—for bringing the bottom-board into proper position with relation to the other boards assembled around the form; that is, so that it will be in required juxta-position or registry with the said other boards that are about to be brought against it, is as follows:—particular reference being had to Figs. 15 and 25:—The hopper, 16 has a skeleton bottom, 140, underlying which is a rack, 141, that is adapted to slide horizontally in suitable guideways of a part of the frame of the machine, and has a cross-head, 142, carrying pusher-bars, 143, that extend up through slots, 140ª, in the hopper bottom. When the rack is at the limit of its outward stroke, the inner ends of the bars, 143, are just beyond the outer side of the hopper (16); that is, beyond the outer edge of the lowermost board in the latter. The teeth of the said rack engage those of an underlying gear, 144, upon a shaft, 145, that has a bevel gear connection, 146, with the upper end of a vertical shaft, 147, the lower end of which latter shaft has a bevel gear connection, 147ª with a horizontal shaft, 148. The last mentioned shaft has a gear, 149, which engages the before mentioned gear, 82, of shaft, 81, as seen in Figs. 6, 14, and 22,—that is actuated through the intermediate gearing hereinbefore described, by the movements of the carriage, 40.

Upon the forward movement of the carriage, and consequently of the rack, 141 (in the present instance in a direction at right angles to that of the carriage, 40) the bars, 143 impinging against the edge of the board resting upon the hopper bottom, push the board on to a tilting table, 150, against a stop, 151, which table, like the tables, 110, for the side boards, is pivoted to a slidable carrier, 152, Figs. 15 and 25, having on its under side a rack, 153. This rack engages a gear, 154, upon a horizontal shaft, 155, having a bevel gear connection, 156, with a vertical shaft, 157, having a gear, 157ª, on its lower end that engages a rack, 158, which is adapted to slide longitudinally in horizontal guide-brackets, 159, Fig. 25, of the frame of the machine. One end of a rod, 160, Fig. 5, is pivotally connected to said rack (158) and the other end is pivoted eccentrically to a gear, 161, that engages a mutilated gear, 162, Fig. 2, 5, and 7, on the main shaft, 2.

The inner end of the table, 150, is pivoted to the carrier, 152, and this end of the table is provided with two downwardly projecting arms, 163, Fig. 15, which, when the table is caused to move inwardly by the mechanism above described, contact against rollers, 164, secured to the frame of the machine, and so tilts up the table, and thus the board thereon, to the vertical position. The location of these parts with relation to the form, is such, as shown, that when the board is caused to assume a vertical position, it will descend by gravity until its lower edge rests upon the drop-plates, 165, hereinafter described, the board being guided in its descent by two stationary, vertical L-shaped guides, 166 Fig. 15, and the up-ended table, 150. The position finally occupied by the board is such that it is in proper registry with the upper and lower end boards and the side boards then against the form, which boards are then being carried forward by said form to said bottom board, preparatory to the nailing operation. The timing of the advance of the form 20, and of the mechanism for bringing the bottom board into the position just described, is such that the said board reaches that position immediately before the carriage, 40, with the form, has reached the limit of its forward stroke.

In order to effect longitudinal adjustments of the bars, 143, in correspondence with the width of the bottom boards the cross-head, 142, carrying said bars, is made slidable up on the rack, 141, the latter having a slot, 167, through which pass one or more clamp bolts, 168, that are secured to said cross-head. The rear ends of said bars are beveled as seen in Fig. 25, so that on the return movement of the rack, the said ends will not catch against the then lowermost board in the hopper (16). The stop-plate, 151, is also made transversely adjustable by means of clamp-bolts, 169, entered in slots, 169ª, in the carriers, 152.

To insure that the upper and lower edges of the side boards shall be flush with the edge of the upper end board, and the edge of the lower end board, respectively, preparatory to the nailing operation, that is, after these boards have been assembled around the form, as before described, we employ two yielding bars, 170, Figs. 15 and 27, whose ends towards the form, 20, are beveled upwardly as seen in Fig. 15, and which we hereinafter term the "presser-bars". These bars are held projected normally below the plane of the upper edge of the side boards, and also that of the upper end board, by means of coil-springs, 171, upon rods, 172, that are slidable vertically in arms, 173, that, in the present instance, rise from the upper bars (216) which carry the nail holders for the side board nailing mechanism, hereinafter described. The upper ends of rods, 172 are screw-threaded and are provided with nuts, 172ª, for effecting vertical adjustments of the presser-bars.

When the form, 20, is caused to advance carrying the assembled boards or box-frame, the upper edges of the side-boards, impinging against the beveled end of the presser-bars, pass under the latter, and these boards are thus forced down and so finally brought flush with the upper surface of the upper end board, and flush with the lower surface of the lower end board, which latter then rests upon the before mentioned drop-plates, 165, which plates are in substantially the same horizontal plane as the plate, 85 on to which the lower end board is conveyed from the hopper, 14. As hereinafter described, the drop-plates are adapted to swing downwardly to discharge the box from the machine after the boards have been nailed together.

When the bottom board descends from the tilting table, 150, as previously explained, it is maintained substantially in the vertical position by a part of the nailing mechanism, and by the free ends of the form-bars, 20ª, which have advanced near to the board at the time of the descent of the latter. The side-boards repsectively are maintained in position against the form, 20, while the latter is advancing, by the then vertical tilting tables, 110, until the boards have nearly reached the limit of their movement, when they will be supported by a part of the nailing mechanism, as will appear further on.

At a predetermined time in the forward movement of the carriage, 40, the tables, 110, and 150 are caused, by the intervening mechanism hereinbefore described, to return to the horizontal position; that is to say, the respective carriers are returned to position for the tables to receive new boards from hoppers, 15 and 16, the tables descending by gravity as they retract away from the respective rollers, 118 and 164. On the return or backward movement of the carriage a lower end board and two side boards are brought into position around the form, 20, as before, an upper end board resting upon the upper bars of the form, 20. Immediately prior to said return movement of the carriage, and while the forward edges of the boards around the form are against the nail-holders (215) of the two side board nailing mechanisms; which latter are caused to move inwardly and clamp the side-boards against the form, 20, preparatory to the nailing operation, by mechanism actuated from the main-shaft of the machine, all as hereinafter described. On said return movement of the carriage, the catches, 60, projecting above the top of the two upper form-boards, 20ª, impinge against the lowermost of the upper end boards, resting upon said bars, and, being spring-controlled, yield in passing under the board. As, while the form, 20, is retracting a lower end board is being conveyed onto the plate, 85, the catches, 60, of the under side of the two lower form-bars are beveled towards the incoming end-board, so that they, the catches, will yield by the pressure of the edge of the board. It is not necessary, in the present instance, that any of the catches, 60, shall be spring-controlled or yielding except those just mentioned and those on the upper side of the form-bars, 20ª.

*The Nailing Mechanism.*—We now proceed to describe the nail feeding and driving mechanisms, for securing the side-boards to the upper and lower end boards, and the bottom board to the four other boards, reference being had more particularly to Figs. 1, 2, 4, 5, 15, 27, 30, 31 and 32. In these figures, the same or corresponding parts of these mechanisms where they appear, are denoted by similar numerals; the mechanisms for the two side-boards being identical throughout, while in that for the bottom board, certain parts found in the other two are omitted as unnecessary, in the present form of the machine, all as hereinafter described. The nails, n, which, in this instance, are ordinary wire nails, such as shown in Fig. 30, are deposited in hoppers, 179, one at each side of the machine, and are mounted upon a frame or support, 180, rising from the frame of the machine. The bottom of each hopper is a vibratory plate, 181, having a series of longitudinal slots, 182, Fig. 1; and pivoted to an inclined plate, 183, having slots, 184, Figs. 1 and 32, registering with the slots 182. The inner side of the hopper is formed by a plate, 185, whose lower end is close to the top of plate, 181, and is pivoted to lugs of the latter, while its upper end rests against the upper end of the side of the hopper as seen in Fig. 27. This plate, 185, is provided with notches, 185ª, on its lower edge, that register with the slots, 182 of the bottom plate, 181, as seen in Fig. 29, the width of these notches being such as to permit the passage of the head of a nail depending from the plate, 181, through the slot, 182. The under side of said bottom plate, 181, is pivotally connected eccentrically by a rod, 186, to a disk or wheel 187, upon a horizontal shaft, 188, journaled in the frame, 180, and having a bevel-gear connection, 189, with a vertical shaft, 190, whose lower end has a similar connection, 191, with a horizontal shaft, 192, which is journaled in bearings of the frame of the machine. For a purpose hereinafter referred to, the gears of the latter connection are connected to an elbow, 193, and the gear of shaft, 192, is slidable upon the latter, being splined thereon. Shaft, 192, has a bevel gear connection, 192ª (indicated by dotted lines in Fig. 6) with a shaft, 194, that has a like connection, 194ª with a vertical shaft, 195, having a similar connection, 196, Figs. 6 and 7, with the main shaft, 2, of the machine. Thus, the up and down vibratory movements are imparted to the plate, 181, whereby the shanks of nails within the hopper, 179 are caused to enter the slots, 182, and the nails to hang suspended by their heads, which cannot pass through said slots. And when the bottom plate, 181, is in the position shown in Fig. 27; that is, in the same plane with the plate, 183, the nails will slide down the first plate and their shanks entering the slot in the second plate, the nails slide down the latter. At the lower end of plate, 183, are a series of tubular chutes or conduits 197 corresponding and registering with the slots in said plate, and each having an opening, 198, Figs. 30 and 32, at the side, registering with the slot, to permit the passage of the nails from the latter into the chutes, 197.

Upon the upper end of each of vertical shafts, 199, Figs. 30 and 32, that are journaled in the frame, 180, is a star-wheel, 200 whose points project into the slot of plate, 183, that is across the path of the nails descending said slot, as clearly seen in Fig. 32. The space between the points of the star-wheel is somewhat greater than the diameter of the shanks of the nails, $n$, as seen in said figure. To this wheel, or rather to the series of wheels is imparted a step-by-step rotation, in the direction of the arrow, Fig. 32, by the following mechanism:—201 is a slidable horizontal bar that carries a series of spring-controlled pawls, 202, which engage ratchet wheels, 203 on the star-wheel shafts, 199. Pivoted to said bar is an arm, 204, of a vertical rock shaft, 205, that has at its lower end an arm, 206, having a fork, 207, at its free end with a long and a short tine, as seen in Fig. 32. On the upper side of the reciprocatory head (223) for actuating the plungers (220) to drive the nails for securing a side board to the upper and lower end boards, as hereinafter described, is a stud, 208, that is adapted to engage the shorter and inner one of the tines of said fork when the head, 223, is advanced to actuate said plungers; and to engage the longer tine on the return stroke of the head. The latter engagement rocks the shaft, 205, in the direction to cause the arm, 204 to actuate the bar, 201, in a manner to cause the pawls, 212, to rotate the shafts, 199, and consequently the star-wheels to such an extent as to free the lowermost nail whose shank has just been between two points of the star-wheel, thus permitting the nail to pass on to and descend point foremost the chute, 197. When the head is advanced its stud, 208 engaging the short tine of the fork of arm, 207, rocks the shaft 205 and returns the bar, 201 to the former position; the said stud then passing on beyond said tine. In the drawings, the head, 223, has moved a short distance on its forward stroke and the said, 208, is about to pass the short tine (see Fig. 32). The nail chutes, 197, communicate respectively with nail-holders, 215, which are boot shaped, as seen in Fig. 30. In order to permit certain adjustments hereinafter described, of the nail holders, a part, 197ª, of the chutes is made of flexible material such as india-rubber, or sometimes composed of telescopic sections.

The nail-holders for the nails that secure the side-boards to the two end boards are mounted, at suitable intervals apart, upon the upper and lower horizontal bars, 216, of a part of the frame, 180, that carries the nail-feeding devices. The nail holders for the nails for securing the bottom board to the two end-boards are mounted upon similar upper and lower bars, 217, and those for the nails for securing the bottom board to the side-boards are mounted respectively upon brackets, 218, that are secured to a part of the frames, 180, as hereinafter more particularly described.

Certain of the chutes, 197, communicate respectively with nail holders for the side boards; that is, those mounted on the bars, 216; others communicate respectively with the nail-holders on bars, 217, for the bottom boards; and others with those on the blocks, 218. The nail feeding mechanism at one side of the machine supplies all the nails for the half of the box on that side of a vertical plane through the center of the machine; that is a plane parallel with and midway between the two side boards; and the other like feeding mechanism supplies all the nails for the other half of the box. A nail descending point foremost one of the said chutes, enters the upper part of the particular nail-holder,—which part is suitably inclined as seen in Fig. 30,—and finally rests on the bottom of the nail-holder with its point directed towards the forward end or toe of the latter, which is provided with an aperture, 219, all as seen in Figs. 30 and 31. Through a guide opening, 215ᵃ in the rear or heel portion of each of said nail-holders, and in line with the aperture, 219, in the toe, and with nail, n, Fig. 30, extends a rod or plunger, 220, whose outer end has an enlargment, 221. A spiral spring, 222, on each of the plungers between said enlargment and the nail holder, tends to force the plunger outwardly against the before mentioned reciprocatory head, 223, or the similar head, 224 (Fig. 15) that acts upon the plungers of the nail-holders for the bottom board.

In order to insure the proper guidance of nails when driven from the holders by the said plungers as hereinafter described, we employ two similar parts or jaws, 225, Fig. 30 and 31, within said holder adjacent to the toe-aperture, 219, which jaws are maintained normally in contact,—that is, in the closed position, by means of spiral springs, 226, Fig. 31, upon studs, 227, projecting from the outer sides respectively of the jaws. The latter are adapted to slide laterally in a space or chamber, 228.

The rear end of the opening between the jaws is conical as shown, in order to allow the ready entrance of the point of the nail and also the end of the plunger, 220, when the latter is actuated by the head, 223 or 224, as the case may be, to drive the nails, by the mechanism to be described, as follows:— special reference being had to Figs. 1, 2, 4, 5, 9, 15 and 27:—The heads, 223, and 224, have each a reduced rear extension marked respectively, 223ᵃ, and 224ᵃ, the former extension being adapted to slide in a guideway of a support, 230, that is fixed part of the before mentioned frame, 180, upon which the nail-feeding mechanism is mounted; and the extension, 224ᵃ, is adapted to slide in a guide support, 231, fixed to the frame of the machine. 232 is a toggle, one arm of which is pivoted to a part of frame, 180, and the other arm to the extension, 223ᵃ, of head, 223. The toggle for the head, 223 that drives the nails for one of the side-boards is connected by a rod, 233 to the strap, 234 of an eccentric, 235, upon a horizontal shaft, 236, that has a bevel-gear connection, 237, with a shaft, 238, Fig. 5, upon which is a mutilated gear, 239, with which engages a mutilated gear, 240, on the main-shaft, 2, of the machine. The shaft, 236, has a bevel-gear connection, 236ᵃ, Fig. 5, with a shaft, 241, which carries an eccentric, 242, whose strap is connected with a toggle, 243 for the head, 224. This latter shaft, 241, has a bevel gear connection, 245, with a shaft, 246, that carries the eccentric, 247, whose strap, 248, is connected to the toggle similar to toggle, 232, for the head that drives the nails for the other side board. When the machine is intended, as in this instance, to be adapted for making boxes of different sizes, it is necessary that the nailing mechanism shall be capable of various adjustments.

We will now proceed to describe the construction whereby adjustments of the said mechanisms as a whole, for the two side-boards respectively, may be effected, to suit the width of the box to be made, and subsequently the means for effecting independent adjustments of the nail holders, for the sideboards to suit the depth of the box. In describing the first construction we will also describe the means for causing a part of the side nailing mechanism, that is, the nail-holders thereof, to move inwardly and clamp the side boards against the edges of the upper and lower end-boards, at the proper predetermined time, as hereinbefore alluded to, whatever be the position to which the nailing mechanism is adjusted.

The frame, 180, a part of which it will be remembered carries the nail-holders for the side-boards, as well as the nail-feeding mechanism &c, is adapted to slide inwardly and outwardly in suitable guide-ways of a part of the main frame of the machine. Projecting from the under side of said frame, 180, is a lug, 250, with a screw-threaded hole through which passes a screw-threaded shaft, 251, Fig. 27, that is journaled in a bearing of the main frame of the machine. On the outer end of this shaft is a toothed wheel, 252, Figs. 2, 5, and 27, and pivoted on that end of said shaft is a bifurcated arm, 253, having a hole, 254, Fig. 27, through which a detachable pin, 255, is entered between two adjacent teeth of the wheel, 252. The free end of arm, 253, is pivotally connected by a rod, 256, Figs. 2 and 5, to the upper arm of a two-arm lever 257, which is pivoted to the machine-frame. To the lower arm of said lever is pivoted a yoke, 258, Fig. 2, through the slot, 259, of which passes the main shaft, 2, of the machine. This shaft has on one side of the yoke an arm, 260, and on the opposite side a similar arm, 261, Fig. 2ᵃ. During a part of the rotation of shaft, 2, the arm, 260, is adapted to impinge against a stud, 262, of yoke, 258, and arm, 261, against a stud, 263, on said yoke, during another part of the rotation of said shaft; thus a reciprocatory movement is imparted to the yoke, 258. At each forward stroke of the latter, the wheel, 252, and consequently the screw-shaft, 251, will, through the described connections between said wheel and said yoke, be rotated to a certain extent, and so advance the frame, 180, and the parts supported thereby, a predetermined distance bringing the nail-holders, 215, against the side-board, which had just been maintained in place by tilting table, 110, hereinbefore described, and thus clamping the board against the form-bars 20ª, i. e.— substantially against the upper and lower end-boards,—at the same time that the opposite side board is likewise clamped by the similar mechanism for actuating the frame, 180 on that side. On the return stroke of the yoke, 258, which takes place immediately after the nails have been driven, the frame, 180, recedes to the original position.

In order to permit the shifting of the eccentric carrying shafts, 236, and 246, when the frames, 180 are reciprocated, the bevel-gear connections of the shafts are each connected by elbows, 264, Fig. 5, and the gears of shaft, 238 are slidable,—being splined, thereon, and the gears on shaft 241, are similarly slidable. Also as hereinbefore stated, the gears of the connection for driving the shaft, 190 for vibrating the nail-hopper bottom-plate, 181, are likewise connected by an elbow, 193, and the gear on shaft, 192, is slidable thereon, as before mentioned. Thus the mechanism will vibrate the hopper-plate at whatever position the frame, 180 may be moved or adjusted. When it is required to adjust said frame, that is the side-board nailing mechanism as a whole, to suit the width of boards or boxes to be made, the before-mentioned pin, 255 is withdrawn from engagement with the wheel, 252, and the screw-shaft, 251, is suitably turned by the hand to slide the frame to the desired position, whereupon pin, 255 is reinserted between two of the teeth of said wheel.

The nail-holder and driving mechanism for the bottom-board is identical with that for the two side-boards, except that nail-holders, 215, for the former and their plungers are so arranged that the nails are driven along the top, bottom and two sides of the bottom board, into the ends of the upper and lower end boards and the ends of the two side boards respectively.

It will, of course, be understood that the mechanisms for feeding down the nails to the respective holders, and the other nailing mechanisms are suitably timed with relation to the mechanisms for carrying the boards from the lower end board and side board hoppers into proper position with relation to the form, 20, and with the mechanisms for actuating said form. Now, the series of nails having been carried down into the respective nail-holders, as described, and the side-board frames, 180, having been advanced to clamp the side-boards at the prescribed time, the rotating shafts, 236, 241, and 246, respectively, carrying the eccentrics, cause the latter to simultaneously actuate the toggles, and compel the heads, 223, and 224, to force in the plungers, 220, to drive the nails out from the holders through the yielding jaws, 225 and thus secure the boards together. Whereupon, as the shafts and consequently the eccentrics, continue their rotation, the heads, 223, and 224, are retracted, and the spring-pressed plungers retract from the nail-holders. The side frames, 180, are now drawn back by the mechanism that actuates the screw-shafts, 251, but before this occurs the form, which had started to return to the original position, where the boards to constitute a part of the next box to be made are assembled about it, will have passed beyond the then completed box; the latter being held by the pressure of the side nail-holders, so that it will not be carried back by the form. On this return movement of the form, 20, the spring-controlled catches on the upper side of the upper form-bars, will, as previously stated, yield as they pass under the lowermost board in the hopper, 13. Immediately after the form, 20, has left the then completed box, the before-mentioned drop-plates 165, which, with the side board-nail holders support the box, are caused, by the mechanism hereinafter described, to swing downwardly on their pivots beyond the vertical plane of the sides of the box, and at the same time the frames, 180, are retracted, and the box being unsupported, falls from the machine. These said drop-plates, 165, are respectively pivoted to the under side of the nail-holder bars, 216. Said plates are pivotally connected by links, 269, to the free ends of the prongs of trident-shaped parts, 270, 271. One of these tridents, 270, is secured to a rectangular frame, 272, that is adapted to slide longitudinally in suitable guideways of the frame of the machine, by a clamp-screw, 273, passing through a longitudinal slot, 274, in part of said frame, and the other, 271, is pivoted to an arm, 275ª, of a three arm lever, 275, that is pivoted at 276, Fig. 26, to the frame, 180. Another arm, 275ᵇ, of this lever is secured to the frame, 272, by a clamping screw, 277, that passes through a slot, 278, in said frame. These two arms of lever 275 are of the same length. To the third arm, 275ᶜ, of said lever is pivoted the end of a connecting rod, 279, whose other end is pivoted to the long arm of a rock-lever, 280, having a bifurcated short arm, 281, Fig. 26, between whose bifurcations projects a stud, 282, that depends from the under side of the carriage, 40. The mode of operation of this drop-plate mechanism is as follows: When the said carriage starts to move forward to carry the boards assembled around the form, 20, to the bottom board, as previously described, the stud, 282, of said carriage, impinges against the forward one of the bifurcations of lever, 281, thereby rocking the latter, and so drawing back the connecting rod, 279, and consequently rocking the three arm lever 275, the effect of which is to throw the trident 270, inwardly, and at the same time to slide the frame, 272, in the opposite direction, to the same extent as the throw of said trident.

This movement of said frame, carries the other trident, 271, inwardly towards the first-mentioned trident, 270. The effect of the movement of the two tridents is to cause the drop-plates, 165, to swing to the horizontal position, as shown in the drawings. In this position they remain until after the before-mentioned nailing operation has taken place, when the carriage, 40, is retracted, as also before described, and immediately before the latter has reached the limit of its retraction the stud, 282, impinges against the rear one of the bifurcations of lever, 281, and thus reverses the before described movements of the tridents, thereby turning the drop-plates downwardly on their pivots and thus allow the finished box to fall from the machine.

In the drawings, the frame, 180, and the tridents, 270, and 271, are at their furthest distance apart. When, however, frames, 180 are adjusted inwardly for boxes of less width, the clamp-screws, 277, for the arm 275$^b$, of lever, 275, are loosened, the frame, 272, and consequently the trident, 271, and adjuncts, is slid in the direction of the trident, 270, to the required extent. The last-mentioned trident is then slid inwardly upon frame, 272, to a corresponding extent; whereupon the two set-screws are again tightened up.

For purposes of vertical adjustment, we sometimes make the drop-plates, so to say, in two parts; that is, with a plate 165$^a$, supported upon the main plate by means of adjusting screws, 165$^b$, Fig. 28.

Having described the means whereby the nail-holders for the side-boards are adjusted to suit the width of the boxes, we shall describe the means whereby the nail-holders may be adjusted to suit the other dimensions,—length and width,—of the box. First, as to the length of the box which is the height thereof as it stands in the machine:—The three upper ones of the nail-holder bars, 216 and 127 are connected together and are vertically slidable as a whole in suitable guideways of uprights, 283, of the frame, 180. As in this (adjustable) machine the respective nailing mechanisms as a whole for the side-boards are both adjustable and reciprocatory, it is necessary, in order to effect vertical adjustments of the said three upper nail-holder bars simultaneously that the two side-bars, 216, shall be capable of sliding on the other bar, 217. To this end, we connect the two side-bars to the latter bar, by a suitable joint, as the T-joint seen in Fig. 15, and we also connect the lower ones of the side-bars, 216, to the other lower bar, 217, by a similar joint, the sidebars on one side only being fixed to the said other upper and lower bars respectively. The said three upper bars are adjusted by means of rotatable screw-shafts, 284, Fig. 15, that are journaled to a cross-bar, 285, that is part of the frame, 180. The said screw-shafts pass through screw-threaded holes in the upper side-bars, 216, one near each end of the latter; there being two of said shafts for each side bar. By turning these shafts, the three bars may be simultaneously moved up or down as may be required. As a convenient means for turning each pair of shafts simultaneously and equally, I provide a horizontal rotatable shaft, 286, with a milled collar thereon, and bevel gears, 287, at the ends that engage similar gears, 288 on the upper ends of the screw-shafts 284, as seen in Fig. 15.

As it will be observed that there are eight lines or rows of the nail-holders, six of which are horizontal and two vertical, the latter for the nails that secure the bottom board to the side-boards,—it is necessary that the nail-holders of certain of these several rows, or all of them, shall be independently adjustable in order to properly or equally space the nails to be driven. To this end the nail-holders of the horizontal rows are secured to the bars on which they are mounted by means of T-heads on the under side, which heads are entered into a corresponding longitudinal groove, 289, in the said bars, see Fig. 34. Thus the nail-holders may be slid along the latter and then secured in place by screw-bolts, 290, Fig. 34. The said brackets, 218, upon which the nail-holders of the vertical rows are mounted are secured on the hereinbefore mentioned vertical bars 283, of the frames, 180, respectively. Each of these bars has a vertical slot, 292, that is adapted to receive a projection, 293, of the nail-holders. The latter are held in place upon the bars, 291, by means of screw-bolts, 294, and an intervening washer. By loosening up the bolts, the brackets may be adjusted up or down as may be required, and then clamped in place by said bolts. The nail-holders are secured to the brackets by means similar to that used to secure the nail-holders on the bars, 216 and 217.

We remark that our invention is not limited to the precise construction shown and described, whereby the various movements and operations are effected at the proper perdetermined times, as any one skilled in the art to which the invention pertains, can considerably vary the constructions without departing from the essential principles of the invention.

Having thus described our invention, we claim as new and desire to secure by Letters Patent:—

1. In a box-making machine, of the character recited, the combination of the rectangular form, the upper end board hopper, beneath which said form extends, the lower-end board hopper, mechanism for conveying boards from the latter hopper into position beneath said form, the two side board hoppers, the pivoted tilting tables, supports for said tables means for conveying the boards from said side-board hoppers on to said tables, and mechanism for moving said tables on their supports and to contact with the latter for causing the tables to tilt on their pivots from a horizontal to a vertical position and the converse, substantially as and for the purpose set forth.

2. The combination of the rectangular form, the upper end board hopper beneath and adjacent to the lower end of which said form extends, the lower end board hopper, the side-board hoppers, mechanism for conveying a board from said lower end board hopper into position beneath said form, mechanisms respectively, for conveying boards from said side-board hoppers and bringing the same into vertical position adjacent to the sides of said form and for maintaining the same in such position, the catches carried by said form, nailing mechanism for securing said side boards and upper and lower end boards together, means for reciprocating said form at predetermined times with relation to said nailing mechanism, the spring-controlled bars for insuring the registry of the side boards with the upper end boards, the drop-plates, and means for bringing the same into position to support the lower end board and side boards when said form is reciprocated to the forward position, and to maintain said plates in that position during the nailing operation and to subsequently bring said plates out of such position, substantially as and for the purpose set forth.

3. In a machine of the character recited, the combination with a rectangular form, of a series of vertical hoppers adapted to receive boards flatwise, and comprising a vertical upper end board hopper extending above and opening upon the top of said form, a lower end board hopper, and side board hoppers, means for supporting the boards therein, means for carrying a board horizontally from said lower end board hopper into position beneath said form, means for discharging boards horizontally from said side board hoppers, means for bringing said discharged boards into vertical position against the sides of said form, and for maintaining the same in said position, catches carried by said form and adapted to engage the edges of said boards, nailing mechanism for securing the boards together, means for reciprocating said form at predetermined times with relation to said nailing mechanism, and means for actuating said mechanism at predetermined times, substantially as set forth.

4. In a machine of the character recited, the combination with a rectangular form, of a series of vertical hoppers adapted to receive boards flatwise, and comprising a vertical upper end board hopper extending above and opening upon the top of said form, a lower end board hopper, and side board hoppers, means for carrying a board horizontally from said lower end board hopper into position beneath said form, means for discharging a board horizontally from said side board hoppers, means for bringing said discharged boards into vertical position against the sides of said form, spring-controlled catches carried by said form and adapted to engage the edges of said board, a vertical bottom board hopper adapted to receive boards flatwise, means for discharging a board horizontally therefrom, means for bringing said discharged board into vertical position in advance of the form, nailing mechanism, means for actuating the same at predetermined times, and means for the reciprocation of said form at predetermined times with relation to said nailing mechanism, substantially as set forth.

In testimony whereof, we have hereunto affixed our signatures this 26th day of May, A. D. 1903.

WILLIAM T. McRAE.
WILLIAM W. CANBY.

Witnesses:
WALTER C. PUSEY,
ANDREW V. GROUPE